United States Patent
Petelycky et al.

(10) Patent No.: US 6,204,840 B1
(45) Date of Patent: Mar. 20, 2001

(54) NON-TIMELINE, NON-LINEAR DIGITAL MULTIMEDIA COMPOSITION METHOD AND SYSTEM

(75) Inventors: Ihor Petelycky, Etobicoke; Michael Harris, North York; Scott Northmore, Port Carling; Graeme Elliot, Toronto; Daniel Staheli, Sharon; Jeff Smith, Stouffville; Alan Page, Toronto; Prasad Maruvada, Richmond Hill; Yongjian Zhai, Mississauga, all of (CA)

(73) Assignee: MGI Software Corporation, Richmond Hill (CA)

( * ) Notice: Subject to any disclaimer, the term of this patent is extended or adjusted under 35 U.S.C. 154(b) by 0 days.

(21) Appl. No.: 09/057,223

(22) Filed: Apr. 8, 1998

(30) Foreign Application Priority Data

Apr. 8, 1997 (CA) .................................... 2202106

(51) Int. Cl.$^7$ ...................................... G06T 1/00
(52) U.S. Cl. ........................................... 345/302; 345/328
(58) Field of Search .................. 345/302, 418, 345/433, 434, 328; 707/501

(56) References Cited

U.S. PATENT DOCUMENTS

| | | | |
|---|---|---|---|
| 4,533,188 | 8/1985 | Miniet | 339/17 CF |
| 5,237,648 | 8/1993 | Mills et al. | 395/133 |
| 5,303,388 * | 4/1994 | Kreitman et al. | 395/159 |
| 5,355,450 * | 10/1994 | Garmon et al. | 395/162 |
| 5,359,712 | 10/1994 | Cohen et al. | 395/161 |
| 5,513,306 | 4/1996 | Mills et al. | 395/148 |
| 5,565,888 * | 10/1996 | Selker | 345/146 |
| 5,726,717 * | 3/1998 | Peters et al. | 348/593 |
| 5,812,216 * | 9/1998 | Peters et al. | 348/593 |
| 5,852,435 * | 12/1998 | Vigneaux et al. | 345/302 |
| 5,883,670 * | 3/1999 | Sporer et al. | 348/384 |
| 5,966,121 * | 10/1999 | Hubbell et al. | 345/328 |
| 5,995,115 * | 11/1999 | Dickie | 345/441 |
| 5,999,173 | 12/1999 | Ubillos | 345/328 |
| 6,002,403 * | 12/1999 | Sugiyama et al. | 345/355 |

FOREIGN PATENT DOCUMENTS

WO98/26421    6/1998   (WO).

OTHER PUBLICATIONS

Eisenkolb et al, New PC Video, Abacus Publishing, pp. 161–162, 166–167, 183, 218–227, 233–236, 241–251, 268, Dec. 1995.*

McClelland, Mac Multimedia & CD–ROMs for Dummies, IDG Books, pp. 88–89, 259–261, 268–274, Dec. 1995.*

Webster's Ninth New Collegiate Dictionary, Merriam–Webster Inc., p. 396, Dec. 1984.*

Davis, Marc, "an iconic visual language for video annotation", 21 pages, <http://222.w3.org/People/howcome/p/telektronikk–4–93/Davis_M.html>, Oct. 1997.*

* cited by examiner

Primary Examiner—Joseph H. Feild
(74) Attorney, Agent, or Firm—Blakely, Sokoloff, Taylor & Zafman

(57) ABSTRACT

A method for digital multimedia composition including selecting multimedia data segments, arranging the selected multimedia data segments on a single storyline strip, inserting transitions between adjacent multimedia data segments on the storyline strip, and combining the selected multimedia data segments based on their arrangement on the storyline strip and based on the inserted transitions, to produce a multimedia output file from the storyline strip. A system is also described and claimed.

39 Claims, 25 Drawing Sheets

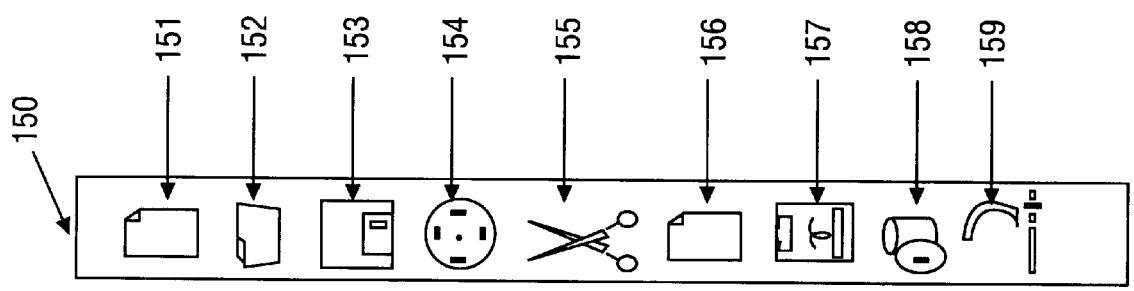

NON-TIMELINE, NON-LINEAR DIGITAL MULTIMEDIA COMPOSITION METHOD AND SYSTEM

COPYRIGHT NOTICE

A portion of the disclosure of this patent document contains material which is subject to copyright protection. The copyright owner has no objection to the reproduction by anyone of the patent document or the patent disclosure as it appears in the Patent and Trademark Office patent files or records, but otherwise reserves all copyright rights whatsoever.

FIELD OF THE INVENTION

The present invention relates generally to the field of information processing and, more particularly to a method and system for multimedia composition.

BACKGROUND OF THE INVENTION

In the past decade, video and audio magnetic tape have emerged as viable alternatives to traditional storage media such as silver halide film for recording, display and reproduction of images, sounds and video. Editing methods in the past originally stemmed from linear or sequential editing of film on a film device. Along with advances in storage media have come new methods of composition based on computerized digital editing techniques that have all but replaced manual editing of magnetic video and audio tape and related media. Digital composition software programs, such as those used to compose digital video, audio and related source materials, have found widespread application in multimedia presentation and authoring systems. Despite their power, these composition software programs require users to master complex interfaces, and adopt abstract representation models which are beyond the grasp of ordinary users.

For example, some prior art composition software programs include user interfaces that employ timeline-based, non-linear and non-spatial representations of what is inherently a temporal-based composition process making the composition software programs difficult to learn and use. The user interfaces are non-linear because various aspects of the composition are displayed as separate elements on different levels or layers. These composition software programs seek to mimic film based editing methods through the application of a timeline-based composition system and method.

However, unlike the film editor who has access to the visual scenes of a movie which he can cut and splice together to produce a desired sequence, the typical video editor has been forced to rely on computer software programs that simulate sequential frames of film on a timeline. The conventional non-linear digital editing method involves the use of computer software for displaying and manipulating a sequence of frames or images on a timeline typically with each frame individually displayed. Where multiple sequences are sought to be confined, each sequence is displayed on a separate, horizontal timeline. Audio to accompany the video is placed on a separate timeline. The video and/or audio sequences contained in each timeline are not viewable until a production stage is completed. While this method offers significant productivity gains over the complex and time-consuming task of manual editing, the timeline based method utilized in current non-linear digital video and audio composition systems is extremely complex, non-intuitive and cumbersome to use because of the multiple timelines or layers.

One of the problems with the prevailing non-linear composition method is that it breaks a composition into a non-temporal representation of multiple layers of image and/or audio sequences in what is inherently a temporal relationship. This method not only forces users to constantly switch between separate program modules to perform routine composition tasks for each layer, but greatly increases the complexity of the composition display due to the inherent need to accommodate multiple timelines or "layers", each with its own associated images. A user is forced to mentally visualize the combined layers as well as their effects as editing is performed. Thus the composition process is, as a consequence, very complex and tedious. As a result, much of the power of these composition software programs is untapped by all but the most advanced users due to the inherent complexity that results from attempting to represent a spatial and temporal composition process by means of non-spatial, timeline-based models and methods.

U.S. Pat. No. 4,538,188 to Barker et. al. discloses a video composition method and apparatus utilizing non-linear timeline based composition. Each layer of the video composition method is presented as numerous individual images in a time sequence or timeline order. There are many inherent difficulties and inefficiencies associated with the prior art method that results from the display of temporal source materials in a non-temporal or timeline fashion.

However, despite its inherent limitations, the use of digital non-linear editing methods has increased significantly in recent years due to associated cost advantages offered over traditional video editing methods. Unfortunately, this departure from traditional video editing techniques has in some respects dampened the creative talents of modem video and audio directors who are no longer able to apply their skills directly to the composition process and must instead rely upon intermediate personnel to manipulate the image and audio sequences scattered across multiple timeline layers. Using the non-linear method of digital-based composition, the director's feel for the composition process is greatly diminished. One advantage of composing with the traditional physical editing method using silver halide film, is the ability to react quickly to the temporal nature of the media. Thus, a given sequence of film can be run back and forth, viewed repeatedly, edited and quickly "spliced" together with other sequences to form a completed segment. Thus the source material is treated as an entire object, one that can be combined with other objects to create a composition sequence. The ability to achieve this same effect in a digital non-linear editing environment is highly desirable.

It is therefore an object of the present invention to provide a novel non-timeline, non-linear digital multimedia method and system.

SUMMARY OF THE INVENTION

The non-timeline, non-linear digital composition system and method allow digital source material to be produced while providing the operator with instantaneous feedback. This significantly increases productivity, while at the same time lessens or removes the need for intermediate personnel. This also provides a highly intuitive and creative digital composition environment for non-technical users, editors and directors alike. The present composition method and system also provide a dynamic, intuitive and user-friendly object based composition environment for producing digital source materials for use with a wide variety of commercial applications, media and transmission mediums.

The present composition system includes system software control functions that are highly user interactive and respond to user commands for selecting audio, video and multimedia objects from source materials, displaying these dynamically in a main viewing area, performing one or more composition tasks, applying such composition tasks dynamically to the object, previewing the composited object and placing the finished video, audio and related multimedia source material sequences in a production storyline facility for real-time preview of the sequence composition, and for production of the completed sequence.

The composition system and method of the present invention treat digital source segments, including still frame images, video, audio, three dimensional objects, animation and related multimedia source materials as "digital objects" and allow for both temporal and accurate display. Furthermore, the composition system and method of the present invention allow for application of special effects "filters" that can be applied equally and dynamically to all digital objects in the composition process. Audio special effects filters can be applied directly to an audio file which in turn can be applied to an animated three dimensional video object such that it causes the object to react or modify its motion in a manner consistent with an audio (e.g., music) source file.

The present composition system and method do not rely on representing sequences as multiple static pictorial frames. Instead, the present composition system and method directly parallels the techniques employed in traditional physical film-based composition where editors view and work directly with temporal video and audio "objects" or film sequences that can be played back and forth, viewed, edited and enhanced in a dynamic, real time composing environment. Digital objects can be placed on the storyline in any desired order and can be dynamically manipulated and previewed by the operator at any time. Each digital object can be associated with a pictorial identifier. The identifier for the object can be drawn from any desired pictorial image source. In the case of video segments, the identifier representing a given object can be a single video frame selected either automatically by the system or manually by the operator. The present invention does not use separate frames or pictorial labels to denote the start and endpoint of given source material segments or sequences in a timeline as is characteristic of conventional, timeline-based digital composition systems and methods.

In the case of audio sources, representative object images are selected by the user from a library of representative audio images or automatically generated based on an analysis of the segment's audio wave patterns. Source materials and compositions referenced in the system's source material storage libraries can be grouped and sorted according to user specified criteria. Users can search for source materials stored on both local storage media as well as on-line and network media storage devices according to a wide range of user defined criteria and object properties.

There is thus provided in accordance with a preferred embodiment of the present invention a method for non-timeline, non-linear digital multimedia composition including representing multimedia materials stored in memory as objects, retrieving one or more of the multimedia materials from the memory for display on a composition console, dynamically viewing and editing the one or more multimedia materials on the composition console, placing the objects representing the one or more multimedia materials on a storyline strip of the composition console to create a storyline that is viewable on the composition console, the storyline strip including object viewing and object transition positions, and producing a multimedia output file from objects on the storyline.

There is further provided in accordance with a preferred embodiment of the present invention a system for non-timeline, non-linear digital multimedia composition, the system including means for representing multimedia materials stored in memory as objects, means for retrieving one or more of the multimedia materials from the memory for display on a composition console, means for dynamically viewing and editing the one or more multimedia materials on the composition console, means for placing the objects representing the one or more multimedia materials on a storyline strip of the composition console to create a storyline that is viewable on the composition console, the storyline strip including object viewing and object transition positions; and means for producing a multimedia output file from objects on the storyline.

There is yet further provided in accordance with a preferred embodiment of the present invention a computer readable media encoded with a computer program for creating non-timeline, non-linear digital multimedia compositions from multimedia materials stored in memory and represented by objects including means for retrieving one or more of the multimedia materials from the memory for display on a composition console, means for dynamically viewing and editing the one or more multimedia materials on the composition console, means for placing the objects representing the one or more multimedia materials on a storyline strip of the composition console to create a storyline that is viewable on the composition console, the storyline strip including object viewing and object transition positions, and means for producing a multimedia output file from objects on the storyline.

There is additionally provided in accordance with a preferred embodiment of the present invention a method for producing a multimedia composition including providing a user interface having a source material object window and a storyline strip, the storyline strip having object viewing and object transition positions, associating individual identifiers in the window with time varying dynamic multimedia source material objects, choosing one of the identifiers in the window to retrieve a selected source material object, dragging the chosen identifier across the interface to one of the object viewing positions on the storyline strip, repeating the choosing and dragging to organize a multi-object multimedia composition in a desired order, and generating a multimedia output file based on chosen identifiers organized on the storyline strip.

There is moreover provided in accordance with a preferred embodiment of the present invention a system for creating a multimedia composition from multimedia source material objects, the system including a user interface including a tool bar for accessing system functions, a source library window for accessing multimedia source material objects, a console for previewing and editing the multimedia source material objects to create output objects, and a storyline strip for assembling the output objects to form a multimedia output file, the storyline strip including object viewing and object transition positions, a processor for editing the source material objects and creating the multimedia output file in response to user input entered via the user interface, and a display for displaying the multimedia output file on the console.

There is further provided in accordance with a preferred embodiment of the present invention a system for producing a multimedia composition, the system including means for generating a user interface having a source material object window and a storyline strip, the storyline strip having object viewing and object transition positions, means for associating individual identifiers in the window with time varying dynamic multimedia source material objects, means for choosing one of the identifiers in the window to retrieve a selected object, means for placing the chosen identifier at one of the object viewing positions on the storyline strip to organize a multi-object, multi-media composition in a desired order, and means for generating a multimedia output file based on chosen identifiers organized on the storyline strip.

There is yet further provided in accordance with a preferred embodiment of the present invention a computer readable media encoded with a computer program for producing a multimedia composition from multimedia materials stored in memory as source material objects including means for generating a user interface having a source material object window and a storyline strip, the storyline strip having object viewing and object transition positions, means for associating individual identifiers in the window with time varying dynamic multimedia source material objects, means for choosing one of the identifiers in the window to retrieve a selected source material object from memory, means for placement of one or more chosen identifiers at selected positions on the storyline strip to organize a multi-object multimedia composition in a desired order, and means for generating a multimedia output based on chosen identifiers organized on the storyline strip.

There is additionally provided in accordance with a preferred embodiment of the present invention a method for digital multimedia composition including selecting multimedia data segments, arranging the selected multimedia data segments on a single storyline strip, inserting transitions between adjacent multimedia data segments on the storyline strip, and combining the selected multimedia data segments based on their arrangement on the storyline strip and based on the inserted transitions, to produce a multimedia output file from the storyline strip.

There is moreover provided in accordance with a preferred embodiment of the present invention a digital multimedia composition system including a user interface for selecting multimedia data segments, for arranging the selected multimedia data segments on a single storyline strip, and for inserting transitions between adjacent multimedia data segments on the storyline strip, and a processor combining the selected multimedia data segments based on their arrangement on the storyline strip and based on the inserted transitions, to produce a multimedia output file from the storyline strip.

BRIEF DESCRIPTION OF THE DRAWINGS

An embodiment of the present invention will now be described more fully with reference to the accompanying drawings in which:

FIG. 1E is a bitmap screen shot of the animated three dimensional tool bar icons of FIG. 1D which can be activated to invoke functions;

DETAILED DESCRIPTION OF THE PREFERRED EMBODIMENT

Figure 1A:
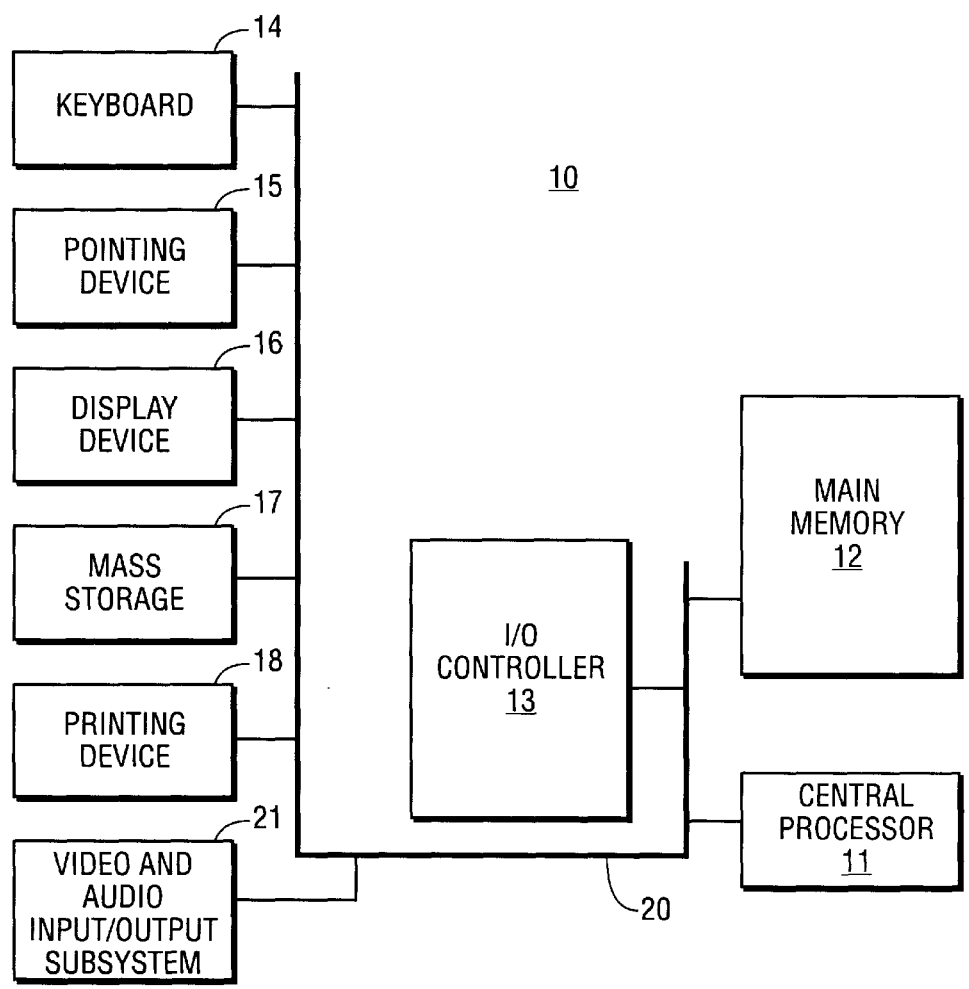
FIG. 1A is a block diagram of a computer system for executing a non-timeline, non-linear digital multimedia composition program in accordance with the present invention.

Referring now to FIG. 1A, a computer system 10 for executing a non-timeline, non-linear digital multimedia composition program in accordance with the present invention to produce multimedia compositions is shown. The composition program when executed allows a user to select video, audio and multimedia objects from source materials and display the selected objects dynamically. Composition tasks can be performed and applied to the objects to create composite objects which can be previewed. Selected and composite objects can be placed in a production storyline for real-time preview. Specifics of the composition program and the computer system 10 will now be described.

As can be seen in FIG. 1A, computer system 10 includes a central processor 11, a main memory 12, an input/output controller 13, a keyboard 14, a pointing device 15 such as mouse, track ball, pen device, voice activated command system or the like, a display device 16, a mass storage disk memory 17 such as a hard disk, a printing device 18 and, a video and audio input and output subsystem 21 for connection of devices such as audio and video cassette recorders, cameras, camcorders, microphones and the like. In the preferred embodiment, the pointing device 15 is a two-button mouse device, including both right and left "mouse buttons. Programming techniques and operations for mouse devices are well documented in the programming and hardware literature; such as Microsoft Mouse Programmer's Reference, Microsoft Press, 1989. Additional input/output devices, such as a digital tape (not shown), devices for access to live video and audio streams from network, internet and broadcast media; and related systems may be included in the computer system 10 as desired.

As illustrated, the various components of the computer system 10 communicate through a system bus 20 or similar architecture. In the preferred embodiment, the computer system 10 includes an IBM®-compatible personal computer, which is available from multiple vendors (including IBM of Armonk, N.Y.). It is within the scope of this invention that other computer designs can be used.

In response to user movement signals from the mouse 15, a pointer floats (i.e. moves freely) across the display device 16 to a desired location. During or after cursor movement, the user may generate user-event signals (e.g. mouse button "clicks" and "drags") for selecting and manipulating on-screen objects, elements and controls, in a manner as is well known in the art.

Figure 1B:
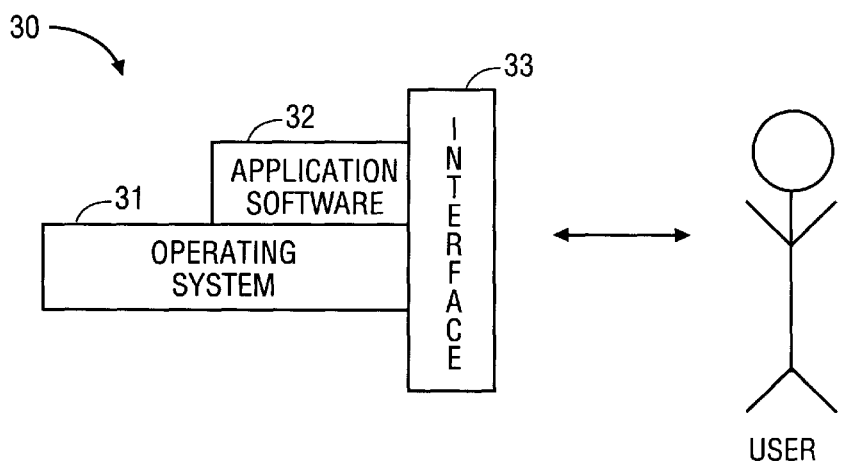
FIG. 1B is a block diagram illustrating the relationship between the computer system of FIG. 1A and a computer software system.

As shown in FIG. 1B, computer software system 30 is provided for directing the operation of the computer system 10. Computer software system 30, is stored in main memory 12 and on mass storage disk memory 17, and includes a kernal or operating system 31, and a shell or interface 33. Application software 32, in this case the composition program, may be "loaded" (i.e., transferred from disk memory 17 into system memory 12) for execution by the computer system 10. The computer system 10 operates in accordance with instructions from operating system 31 and/or the composition program. The interface 33, which, in the preferred embodiment, is a graphical user interface (GUI), is used to display results. It is also through interface 33 that the user may supply additional inputs, commands or terminate the computer session. In the preferred embodiment, operating system 31 and interface 33 consists of Windows 95™ and related programs; which are available from Microsoft Corporation of Redmond, Wash.

Figure 1C:
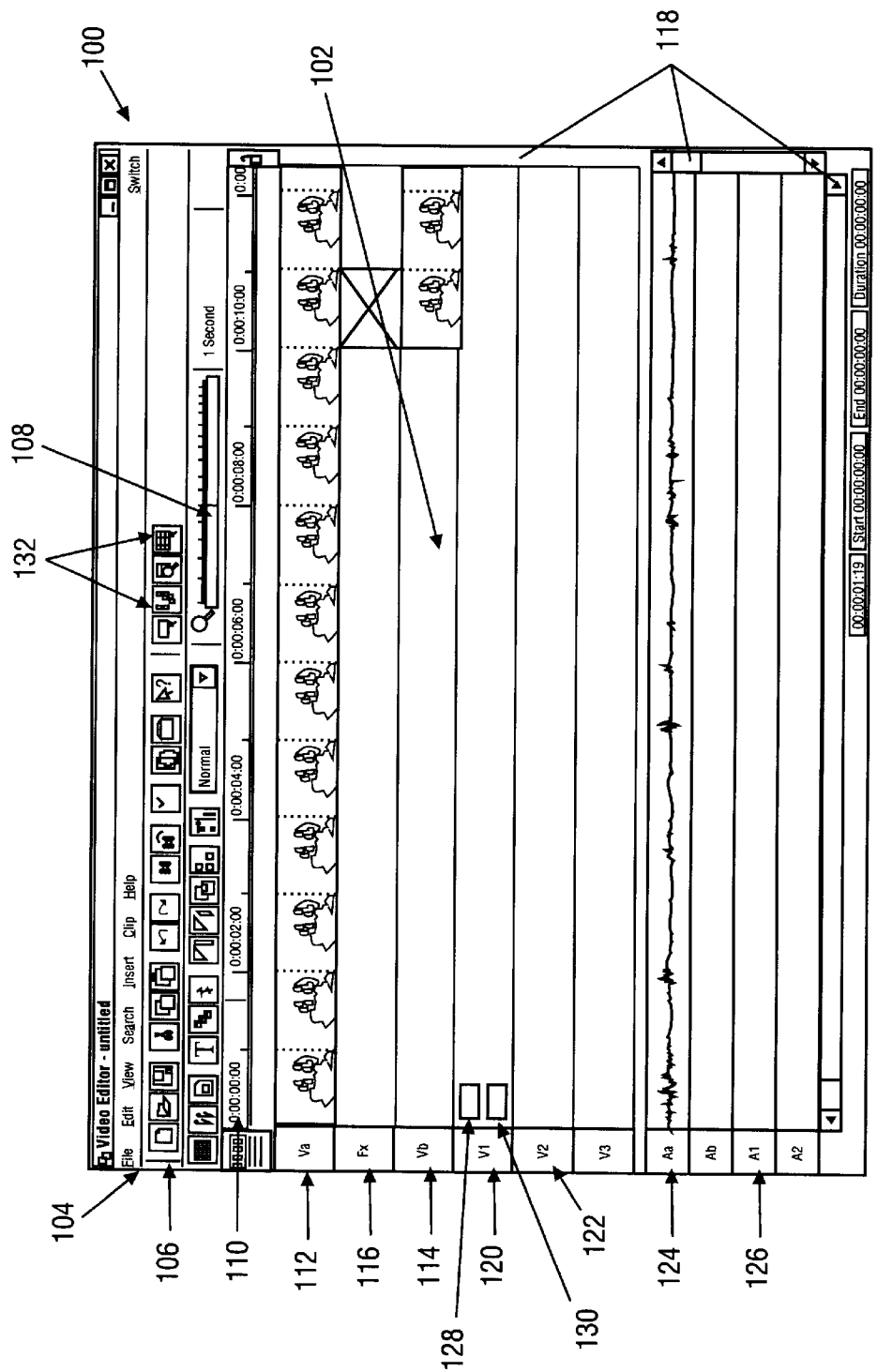
FIG. 1C is a bitmap screen shot of a prior art composition interface illustrating a typical timeline-based, non-linear digital composition program.

For ease of understanding, a prior art timeline, non-linear digital composition program will firstly be described with reference to FIG. 1C. As can be seen, the composition program has a user interface 100 including a system menu 104, a program menu 106 and a timeline area 102 containing multiple timelines. The system menu 104 provides open, close, save and general operators for the whole application. The program menu 106 launches function specific dialog windows using a specific applet interface transferred to each function that when activated, appears and resides on top of the timeline area 102.

Unit time bar 108 provides the user with control over the time increments in the sequentially organized images present in the timeline area 102. As the user increases the time, the timeline collapses showing fewer images in the timeline area 102. A time ruler 110 displays the time scale of the current production. Video layers 112 and 114 of timeline area 102 are two examples of the multiple layers where the user places and manipulates existing video segments of the production. Each video segment consists of multiple sequential frames. Each frame of the production appears separately and horizontally across the timeline area 102. FX layer 116 is where the user deposits an iconic representation of a transition effect such as a dissolve, wipe, etc. This effect is generated using a specific transition effects dialog interface from program menu 106 and is then applied to the FX layer 116. Sliders 118 operate both vertically and horizontally and are used for building multiple special effects by adding layers to the timeline area 102. When many effects are added, information which is not in view on the screen must be accessed using sliders 118 to scroll the window to see the hidden information. The horizontal slider allows the user to view the sequential images on the timeline out of view of the screen.

Video layers 120 and 122 are two examples of a plurality of layers containing a repository of special effects icons which are applied to video layers 112 and 114. It is with the video layers 120 and 122 that various special effects are applied, after they have been generated using function specific dialog windows from program menu 106.

Audio layers 124 and 126 are where the audio portion associated with the composition are represented. They are also where additional audio files may be added as separate layers to be applied to the video layers, 112 and 114.

Special effects icons 128 and 130 represent a particular effect that has been introduced to effect the video residing in video layers 112 and 114 and FX layer 116. Each special effect icon 128 and 130 is associated with a certain range of times on time ruler 110.

Shortcut buttons 132 allow for manipulation of the time base for the composition, and to other functions available on system menu 104 used to edit the production.

As can be seen, the prior art non-linear digital composition program employs a series of discrete, special purpose composition editors (not shown) accessible through system menu 104 that are utilized independently of the timeline presentation display to perform basic composition tasks such as applying text and video animation effects to a given composition. Each composition task or step requires a separate timeline sequence or "layer" such as video layers 112, 114, 120 and 122, FX layer 116 and audio layers 124 and 126 to be created and displayed for each sequence element needed that is used to produce a final composite video or audio sequence. The separate audio and video layers are not combined at editing time, so that the combined result is not known until the playback stage of the process. As will be appreciated, this prior art method involves selectively operating upon the segments on at least two separate layers or levels, each with its own associated timeline. Furthermore, this method requires grouping of serially connected segments, appearing in layers 112, 114, 116, 120, 122, 124 and 126 into groups that have the same timeline relationship. These multiple layers are difficult to manage.

Figure 1D:
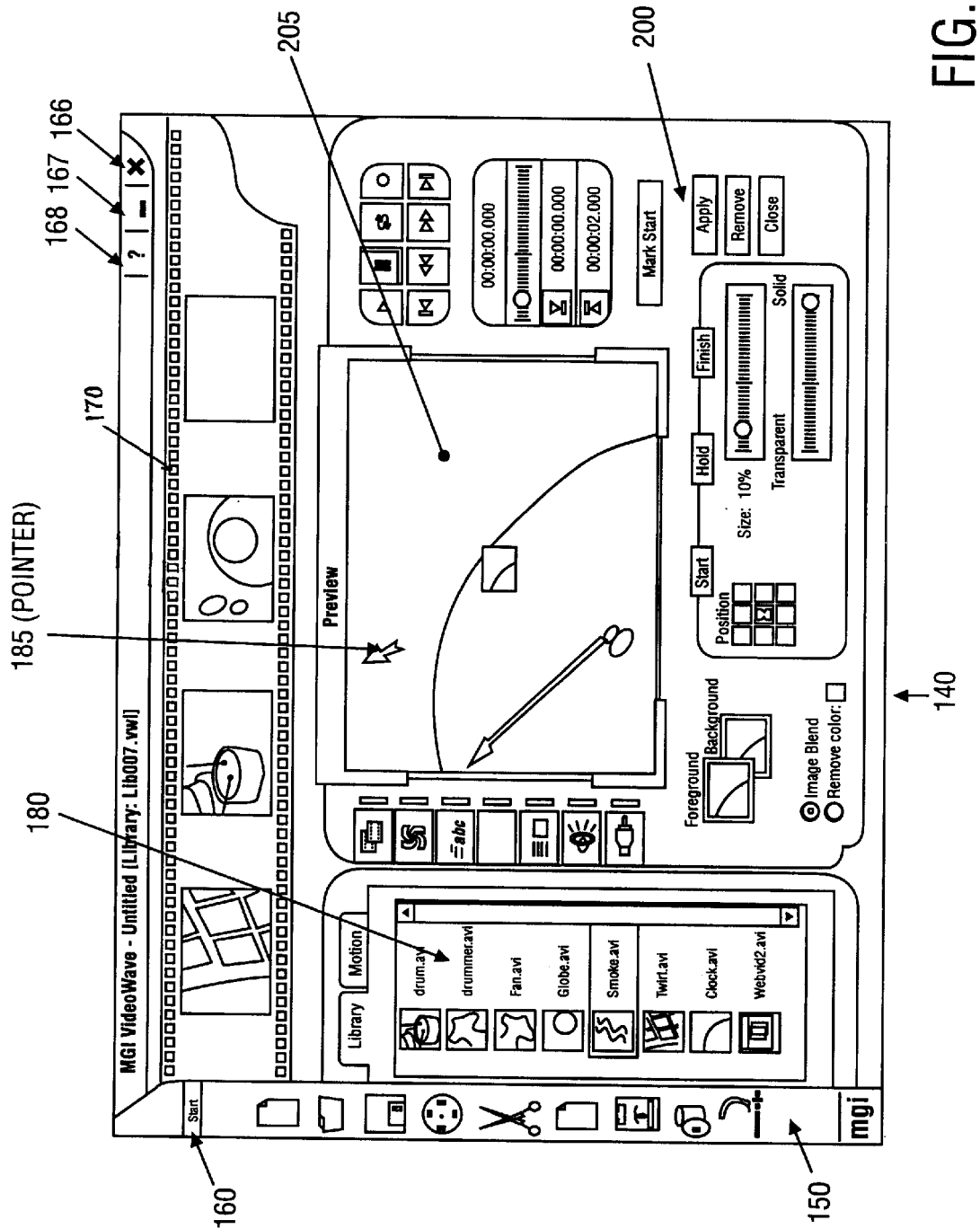
FIG. 1D is a bitmap screen shot of a primary composition user interface of the non-timeline, non-linear digital multimedia composition program executed by the computer system of FIG. 1A including three dimensional tool bar icons, a source library component, a composition storyline component and a primary viewing console.

The non-timeline, non-linear multimedia composition program executed by computer system 10 overcomes the disadvantages associated with the above-described prior art composition program and will now be described with reference to FIGS. 1D to 5E. When the present composition program is executed, a graphical primary composition user interface 140 is displayed on the display device 16 as illustrated in FIG. 1D.

The user interface 140 includes four major areas, namely: a tool bar 150; a source library window 180; a console 200 having a viewing window 205; and a storyline 170. This structure simplifies the receiving, processing and presenting of information, including digital video, audio and related composition data and provides straightforward controls for manipulating and outputting a multimedia composition. A pointer 185 for selecting and otherwise invoking screen objects of interest is also provided and is responsive to the mouse 15. User interface 140 may be closed, minimized or system user help facilities invoked by activating screen close button 166, minimize button 167, or help button 168 respectively. The tool bar 150 features multi-stage three dimensional animated icons which can be activated to provide quick access to common system functions such as opening and saving compositions, generating productions and manipulating objects. The source library window 180 displays and organizes one or more specific digital source objects which can be selected, displayed and manipulated on the console 200. The console 200 is used for previewing and editing specific digital source objects including adjusting images, applying special effects, adding and adjusting fonts, blending objects, manipulating audio and capturing video, images and audio from outside sources. The storyline 170 is used to assemble and manipulate digital source objects, edited objects and transitions into a composition for production.

Tool bar 150 also includes a start button 160 which provides access to a pull down menu (not shown) relating to standard software system interface functions, as described hereinbelow.

To create a composition, a user uses the tool bar 150 to access system functions to create a new composition or edit an existing one. The source library window 180 is used to access various multimedia source materials and place them as objects on the console 200. Editing tools on console 200 are used to edit and apply special effects to the objects. The console 200 is also used to create and manipulate transitions between objects. Objects and transitions displayed on the console 200 can be moved to the storyline 170 and manipulated to form a composition. The tool bar 150 is used to save the composition and generate a final output production.

In response to operator commands through computer system 10, source library window 180 allows the user to "scroll" through lists of source materials displayed as pictorial labels, alphanumeric file names or both representing actual source material objects accessible from computer system 10, mass storage device 17 or input/output subsystem 21. Using "drag" and "drop" object manipulation techniques, the desired source material can be placed in primary viewing window 205 for dynamic preview purposes and for performing a multitude of composition-related editing tasks, as well as positioned in the storyline 170.

Further specifics of the user interface 140 will now be described.

Tool Bar

Turning to FIG. 1E, the tool bar 150 is better illustrated. As can be seen, the tool bar 150 includes a column of icons 151 to 159 respectively. The icons can be activated to invoke a number of functions as will now be described. Icon 151 is activated to commence a new production, providing a blank storyline 170 into which objects, transitions and special effects can be applied. Icon 152 is activated to open a previously saved or recorded composition. Icon 153 is activated to save the currently active composition on the storyline 170 to memory of system 10. Icon 154 is activated to convert the currently active composition on the storyline 170 into a single finished production in a multimedia format such as AVI, MPG, MOV etc. and output the finished production to memory of system 10 or input/output system 21 for later playback. Icon 155 is activated to cut a selected object such as a video clip, transition etc. from the storyline 170 to the clipboard of software system 30. Icon 156 is activated to copy a selected object such as an audio or video clip, transition etc. from the storyline 170 to the clipboard. Icon 157 is activated to paste a selected object such as an audio or video clip, transition etc. from the clipboard to the currently active storyline 170. Activation of icon 158 deletes the currently selected object. Icon 159 activates the undo function, undoing the last user interface operation.

Figure 1F:
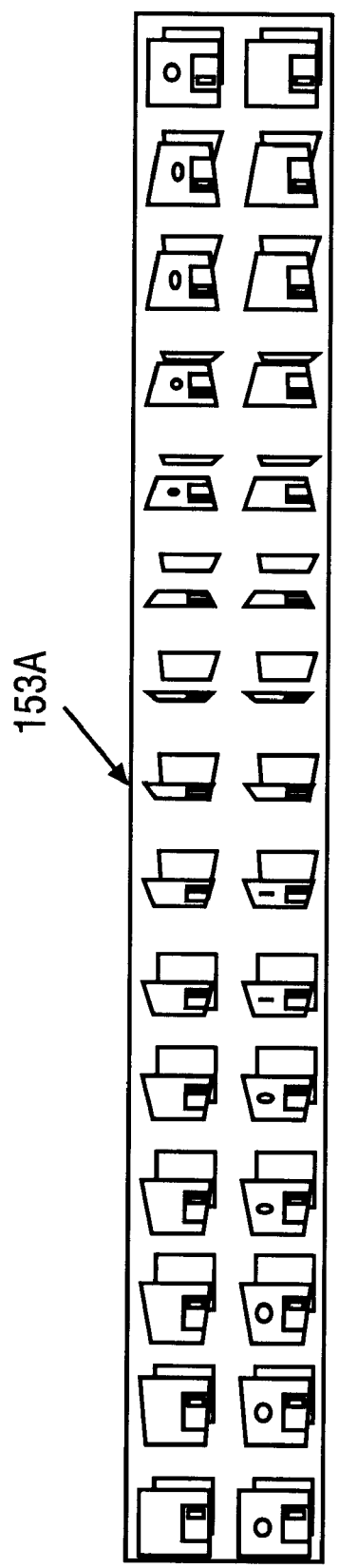
FIG. 1F is a bitmap screen shot illustrating an example of the implementation of animation of one of the three dimensional tool bar icons of FIG. 1D.

Turning to FIG. 1F, the three dimensional aspect of the icons 151 to 159 of toolbar 150 is illustrated. The icons 151 to 159 activate both software system 30 and user controllable properties. These include sound, motion, process monitoring, context-sensitive display, background tasks, etc. Icons 151 to 159 can be programmed in such a way as to respond to the changing information presentation needs of the user.

Each of the icons 151 to 159 of tool bar 150 has three states. The first state is that of a standard two dimensional icon. Upon moving the pointer 185 via pointing device 15 in close proximity, each of icons 151 to 159 gives the illusion of moving outward forming a three dimensional representation. Upon activation, each of icons 151 to 159 rotates and returns to its original position. The illusion of outward motion and rotation is performed by the temporal display of a sequence of images 153a in relief whereby the icon is shown with a shadow behind in various states of rotation. A sequence of images 153a illustrating the above illusion of outward motion and rotation is shown in FIG. 1F, which shows a typical sequence for icon 153. This three dimensional relief and rotation provides two benefits. First, it indicates to the user that the selection of a specific icon has been recognized by the system. Second, the rotation provides feedback to the user that not only has the icon been selected, but that the operation associated with that icon has been recognized and activated by the system.

Each of icons 151 to 159 provides a shortcut to invoke functions which are also accessible through the start button 160. Upon activation of start button 160, a start menu is displayed. The start menu has menu options for production, file, library, tools, help, options and print to video. Submenus relating to production are accessible by activation of the production menu option from the start menu. From the production submenu, there is accessible an additional submenu containing file, edit and insert clip commands relating to production. From the file menu option, standard file commands are available. Also, when the file menu option is selected, a produce menu option appears which, when activated, generates a production of the currently active composition on storyline 170.

When the library menu option is selected, commands relating to the source library window 180 are accessed. Such commands relate to the library area 180 and include file, edit, view, add files and insert into production. From the file sub-menu of the library menu option, the operations of creating a new library, opening an existing library and saving the current active library displayed in source library window 180 are performed. From the edit sub-menu of the library menu option, the features of the currently active library item in source library window 180 are accessed. The edit sub-menu from the library item of the start menu includes a properties option that provides for displaying features of the currently active object, as described hereinbelow with reference to FIG. 3H.

Source Library Window

Figure 2A:
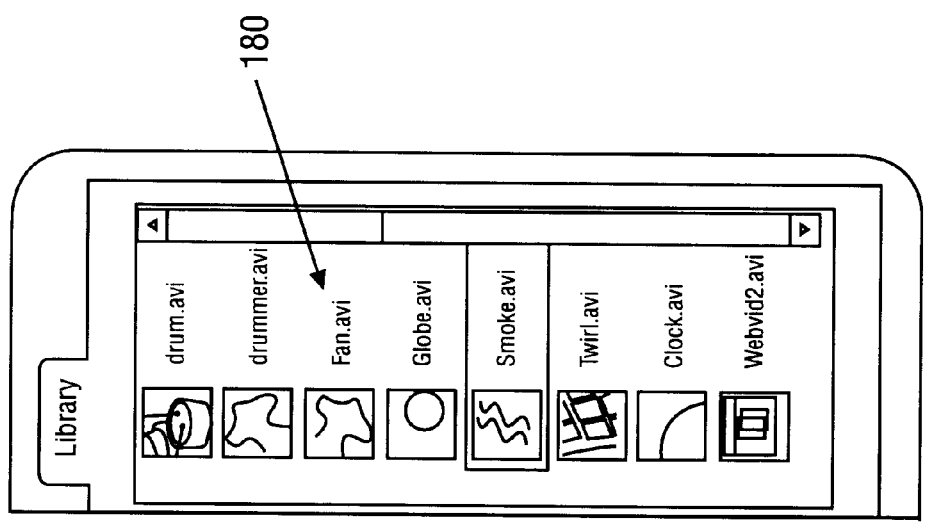
FIG. 2A is a bitmap screen shot of the source library component of FIG. 1D used to store source materials and productions.

Turning to FIG. 2A, source materials are shown as objects within source library window 180 and can be organized into one or more object groupings or libraries. Source materials may be organized according to a multitude of user defined properties such as subject, object type, composition sequence, file type, file name, size, date, etc. The source library window 180 is context sensitive in that it displays source materials which are of the same type as the currently active object on the console 200. For example, if a video object is active in the console, video source material objects are presented in the source library window 180. If a transition appears on the console, various transition effects which can be applied appear in the source library window 180. If an audio object is presented on the console, audio effects which can be applied to the object appear in source library window 180.

Source objects may be organized using hierarchical and relational database file storage methods for rapid retrieval and content management purposes. By positioning the pointer 185 in the described position and right "clicking" with the mouse 15, users can access the software system functions to perform a multitude of tasks. Such tasks include opening, creating and saving new libraries, viewing source files either as dynamic images or alphanumeric file names, adding files to any given library, causing selected files to be placed in the viewing window 205 of console 200 for previewing purposes, causing selected source materials to be automatically positioned on the storyline 170, enabling users to perform cut, copy, paste and delete operations as applied to selected source materials, renaming source material files and displaying given scene properties according to associated file and media properties. Many corresponding operations such as open file, open library, cut, copy and paste are also available using start button 160 of tool bar 150.

Storyline

Figure 2B:
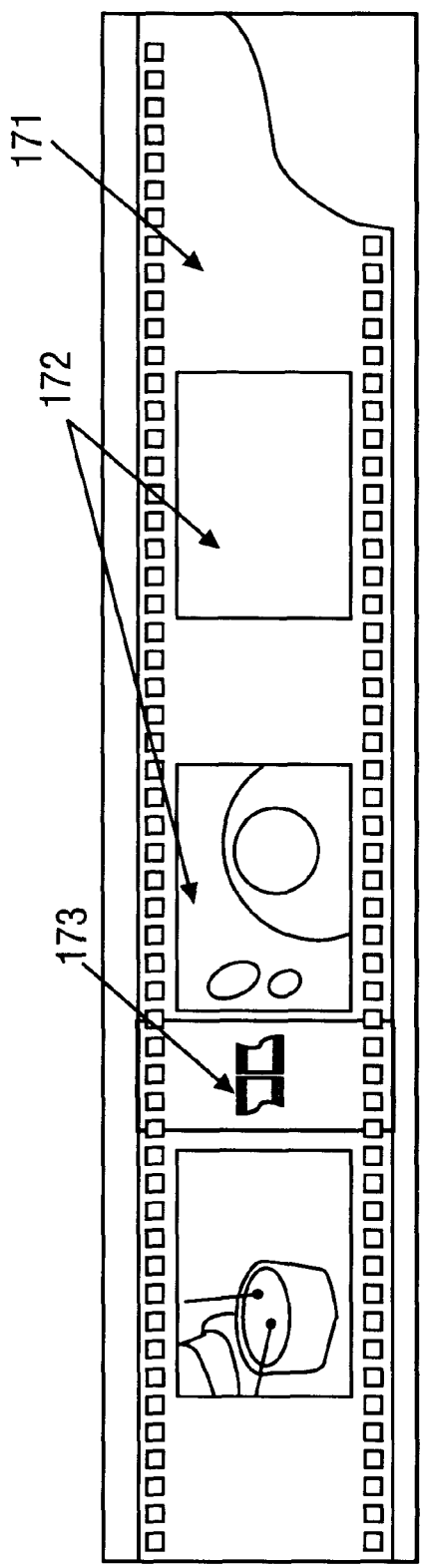
FIG. 2B is a bitmap screen shot of the composition storyline component of FIG. 1D illustrating how finished sequences and transition effects are arranged to create a finished composition sequence.

Turning to FIG. 2B, the storyline 170 is better illustrated and as can be seen, a "film strip" 171 metaphor is utilized. Client windows are located on the storyline 170 and represent viewing frame objects 172 constituting a source material and segment sequence. The client windows are separated by transition frames 173 on the film strip 171. The transition frames 173 are used to denote the presence of transition sequences between two sequential viewing frame objects 172 as well as to provide access to an associated transition composition editor tool by means of a double mouse click. Source material segments can be dynamically rearranged and manipulated by means of "drag" and "drop" techniques on the film strip 171 allowing a user to quickly arrange composition segments into a desired sequence. The film strip 171 sequence display can be manually advanced in any direction by positioning the pointer 185 and selecting and dragging the "film strip" 171 in the desired horizontal direction. A user can also advance to the beginning or end of the composition sequence by means of "Home" and "End" shortcut keyboard commands. Individual viewing frame objects 172 or transition frames 173 can be highlighted for dynamic preview in the primary viewing window 205 by performing a "shift" keyboard command in conjunction with appropriate cursor placement. Highlighting any given viewing frame object 172 or transition frame 173 and performing a left and then a right mouse click operation will cause an associated properties client window to appear. The client window is used to perform related tasks such as dynamic previewing, renaming source filenames, editing transitions and composition production.

Console

Figure 2C:
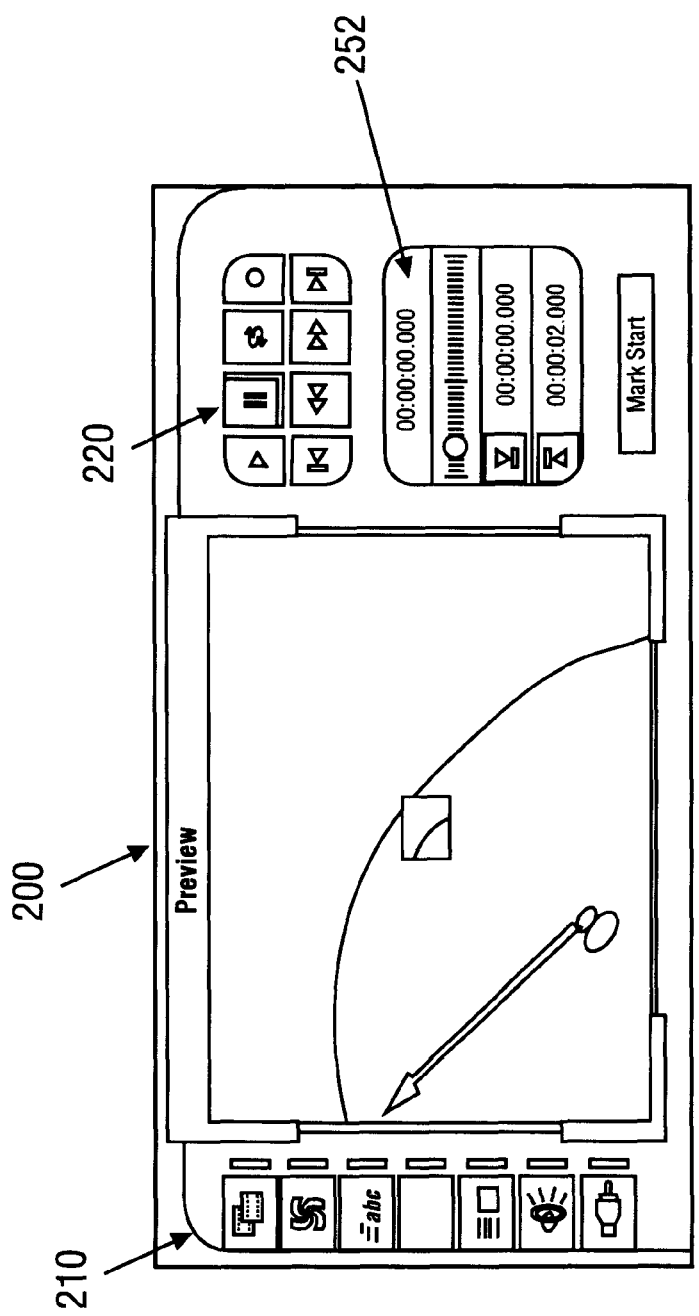
FIG. 2C is a bitmap screen shot of the primary viewing console of FIG. 1D used to display source materials and compositions and to manipulate video and audio segments using various composition tools accessible from the primary viewing console.

Turning to FIG. 2C, the console 200 is better illustrated. The console 200, in addition to the viewing window 205, includes a timing control area 252, an editing tool area 210 having a plurality of editing tool icons and a preview control area 220. Primary composition editing tools are accessed by means of a single mouse click on the appropriate editing tool icons. The composition editing tools when "activated" by the user appear as seamless extensions of the console 200. This console adjustment is commonly known as "morphing". In this manner, the console 200 includes the controls for all the editing needs in one place, in a consistent user interface, without the need for cascading menus.

Figure 2D:
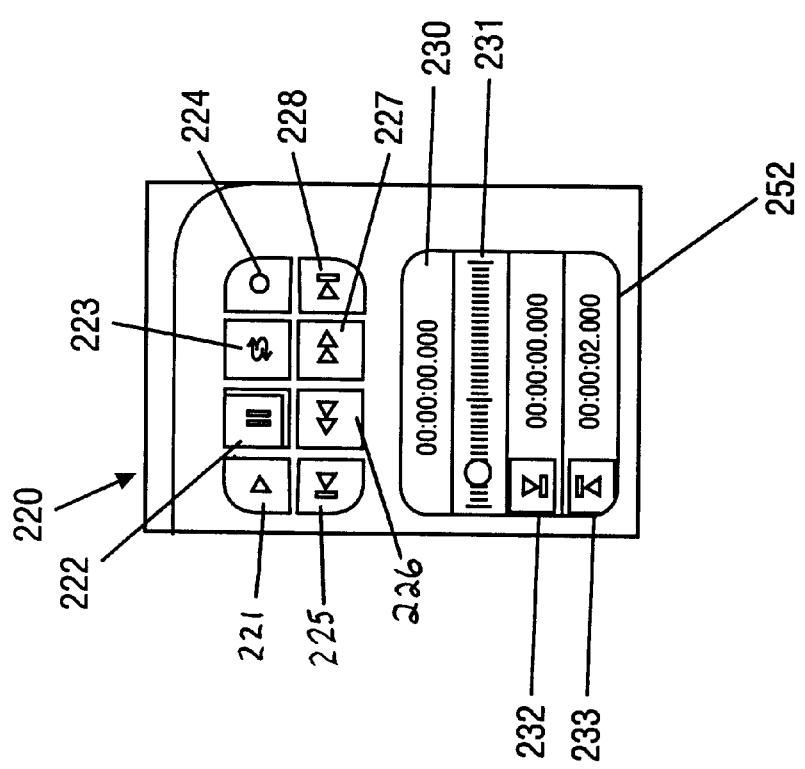
FIG. 2D is a bitmap screen shot of primary viewing console controls of FIG. 2C used to manipulate source materials (i.e. play, pause, advance, etc.) as well as time code indicators to set in and out points used in the editing of source materials for composition purposes.

Turning to FIG. 2D, preview control area 220 and timing control area 252 are better illustrated. Preview control area 220 includes controls that are self-illuminating "buttons" designed to provide the user with visual feedback as to the current active or inactive status of each control or series of controls. These controls include a record button 224, a pause button 222, a play button 221, a previous frame button 226, a next frame button 227, a single frame advance button 228, a first frame button 225, and a loop button 223. Buttons 221 to 228 are designed to mimic standard VCR controls to operate on the object active in viewing window 205. These controls are activated by a single mouse click and an allow an object to be dynamically displayed and played on console 200.

Figure 2E:
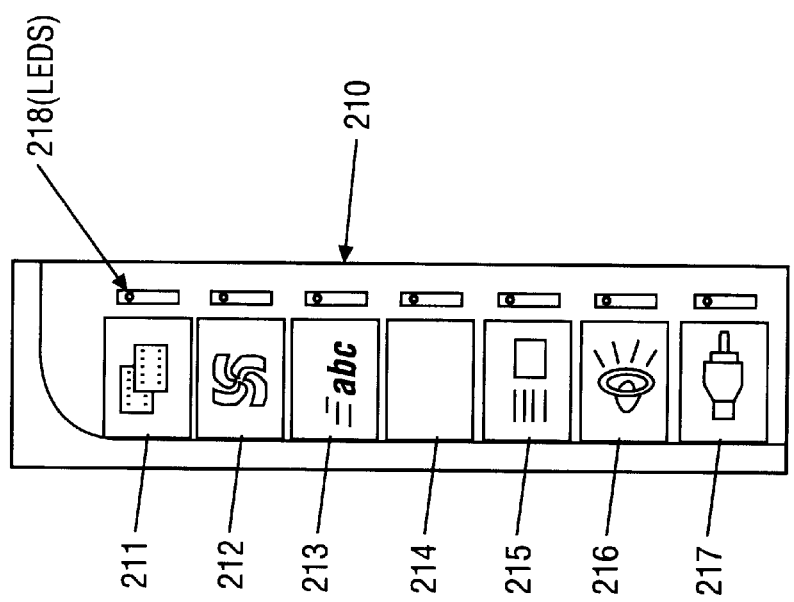
FIG. 2E is a bitmap screen shot of primary viewing console controls of FIG. 2C used to access various composition tools and to display the active status of such tools.

Time control area 252 contains a time code display window 230, a progress indicator ball and slider window 231, a segment start or "in" point indicator and control window 232, and a segment end or "out" point window indicator and control window 233. In time control area 252, video and audio object sequences are assigned internal time codes using the clock within computer system 10 for composition editing purposes unless the source material object already incorporates previously assigned industry Society of Motion Picture and Television Engineers (SMPTE) time code location signals. If SMPTE time code signals have been assigned, they are automatically displayed in conjunction with the source object. Slider window 231 provides the user with a visual segment display progress indicator and control for manually advancing or forwarding of segments displayed within the viewing window 205 by means of cursor and mouse control. Control window 232 incorporates a numeric display and button for indicating a selected start point of the object. The setting of a start of a given object is done in a non-destructive manner in conjunction with video editor 211 (FIG. 2E). Control window 233 incorporates a numeric display and button for indicating a stop point and includes an editing control for determining the end point of an object in a non-destructive manner in conjunction with video editor 211.

Turning to FIG. 2E, the editing tool icons of editing tool area 210 are better illustrated. As can be seen, the editing tool icons represent a series of integrated composition editing tools, including a video editor 211, a special effects editor 212, a text editor 213, a transitions editor 214, a video animation editor 215, an audio editor 216, and a video capture editor 217. The editing tool icons include an accompanying "active" status indicator 218 which appears as a light emitting diode to provide the user with visual confirmation that the editing tools have been used to alter a source material object displayed in the viewing window 205. Edit information is stored with each object and is used when the object is dynamically displayed or played on console 200 and when the composition is finally produced.

Figure 3A:
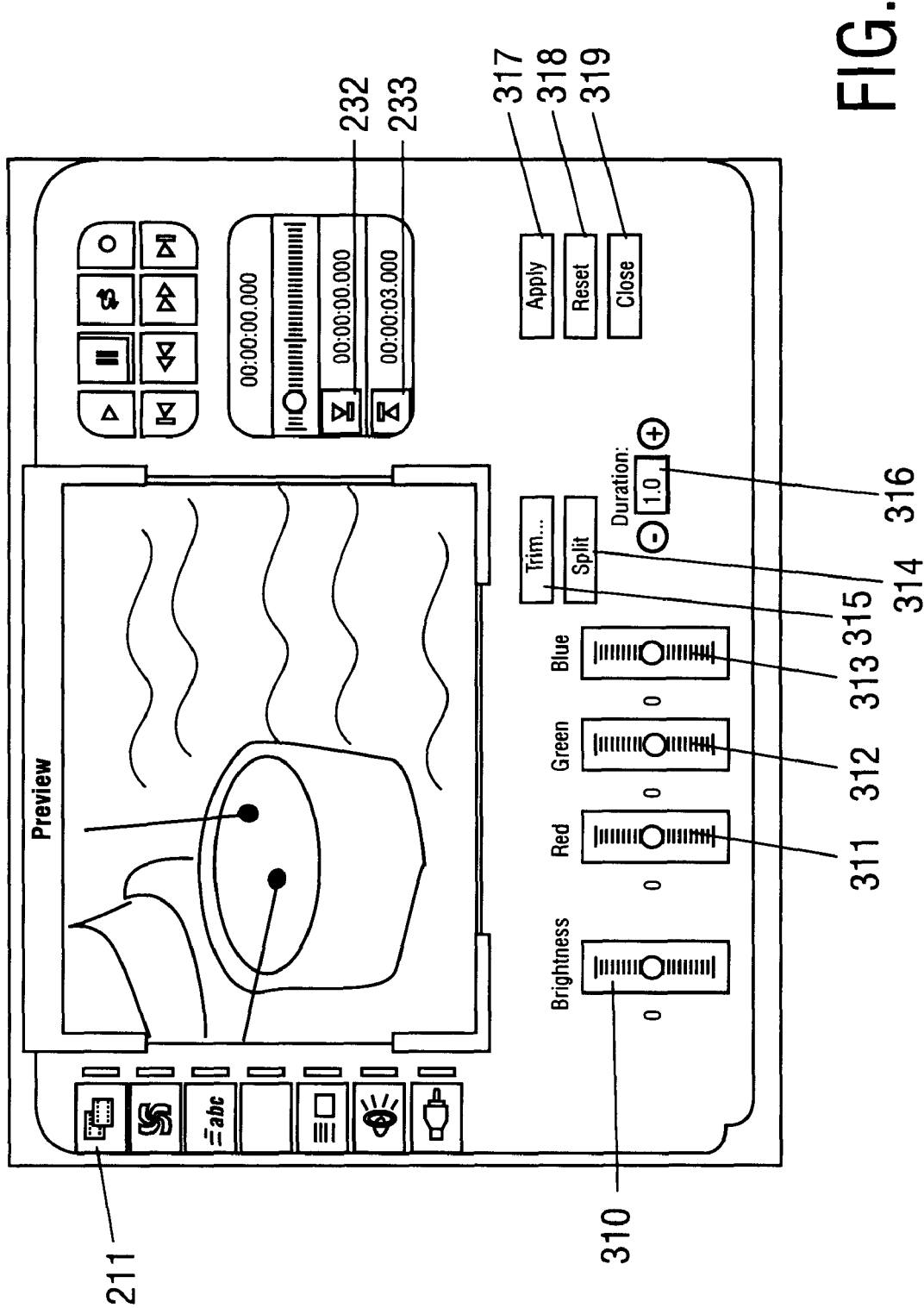
FIG. 3A is a bitmap screen shot of video editor controls of the primary viewing console of FIG. 1D illustrating how color control variations are performed along with related composition operations.

Turning to FIG. 3A, the features of video editor 211 are shown. The video editor includes controls for adjusting aspects of the source material object displayed in the viewing window 205 by manipulating the brightness of brightness slider 310, red control slider 311, green control slider 312 and blue control slider 313. The sliders 310, 311, 312 and 313 include a sliding ball which the user manipulates by means of pointer and mouse controls to adjust the corresponding color intensities of the source object. Additional tools are available by activating trim button 315 for "trimming" a given source object by denoting its start position with the button in control window 232 and stop position with the button in control window 233. The source segment may be split by split button 314 in the same manner as "trimming". This preserves the original object being viewed in viewing window 205 while simultaneously causing an identical copy of the object to be placed on the next sequentially available position of storyline 170. Duration window 316 is also provided for setting and denoting the duration of the object segment currently active within the viewing window 205. By activating apply button 317, the desired editing operation can be applied to the object. The original object settings can be reset or removed by activating remove/reset button 318. The editing tool can be closed by activating close button 319. Buttons 317, 318 and 319 apply to all of the editing tools in editing tool area 210 and operate in a like manner.

Figure 3B:
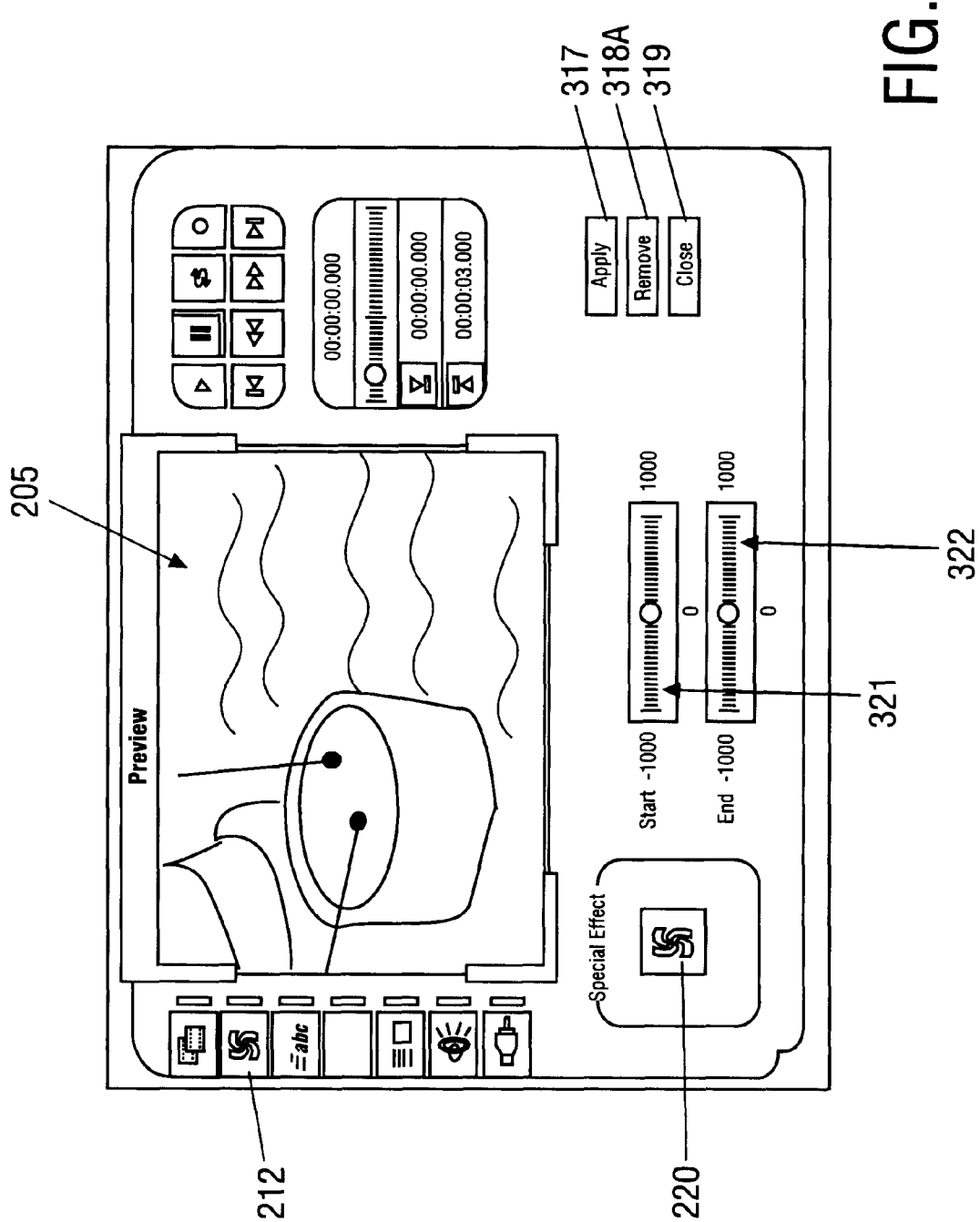
FIG. 3B is a bitmap screen shot of transition composition controls of the primary viewing console of FIG. 1D.

Turning to FIG. 3B, the features of special effects editor 212 are shown. The special effects editor 212 is integrated within the console 200 and allows special effects "filters" or processes to be applied to a given source object selected from a library in source library window 180 of FIG. 2A. The special effects filters are represented by pictorial images 220 for use in conjunction with any given object currently being displayed within the viewing window 205. The duration and intensity of the selected special effect at the start of display of the object and at the end of display is determined by means of start slider 321 and end slider 322. Sliders 321 and 322 utilize a sliding ball and duration scale and the effect created by the special effects editor 212 is dynamically previewed or demonstrated utilizing the viewing window 205. This provides the user with immediate feedback and visual confirmation of the special effect. Once determined, the special effect sequence can be applied by activating apply button 317. The special effect can be subsequently removed by activating remove button 318*a*. The editing tool can be closed by activating close button 319.

Figure 3C:
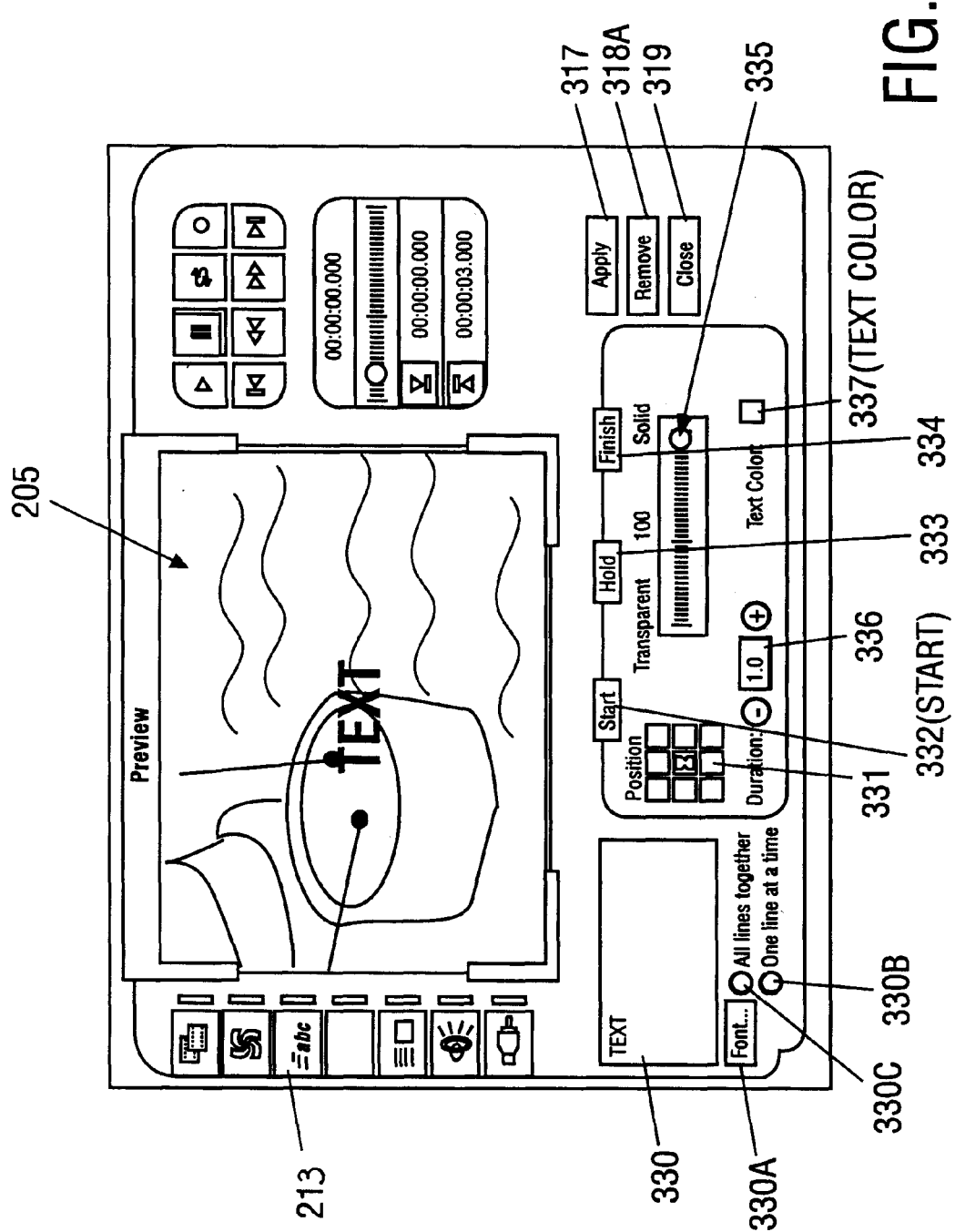
FIG. 3C is a bitmap screen shot of text editing controls of the primary viewing console of FIG. 1D.

Turning to FIG. 3C the features of text editor 213 are shown. The text editor 213 is integrated within the console 200 and allows both static and animated text within any given source object or composition. Text window 330 permits the user to enter text into a text box 330, to be incorporated into source video objects displayed within the viewing window 205. As text is entered into text box 300, it is dynamically displayed in viewing window 205 to provide immediate user feedback. Control button 330*a* enables the user to select from a system list of font types and sizes. Font buttons 330*b* and 330*c* permit the user to designate whether font effects are to be applied to individual lines of text or groups of text respectively.

Text overlays are dynamically positioned for application to video as illustrated in position control pad 331. This enables the user to dynamically position text and determine both duration properties and motion control paths of the text across viewing window 205 as part of an animation sequence. Start button 332 in conjunction with the position of a movable pointer on control pad 331 determines the "start" position and properties such as transparency, color, etc., of the initial application of text to the active source object in viewing window 205. Hold button 333 determines the period between the start and finish of the display of the object through its sequence. The finish button 334 determines the end of the display of the active object through its sequence. Hold button 333 and finish button 334 operate in a similar manner to start button 332 and are used to control the "hold" and "finish" properties and positions of the text as the object is displayed in viewing window 205. Transparency slider 335 enables the user to vary text transparency levels, while text color box 337 provides access to the system color palette for application to text and font data previously determined by the user. Duration box 336 allows the user to control the duration of each text animation "event" as applies to position control pad 331, start button 332, hold button 333 and finish button 334 respectively.

Figure 3D:
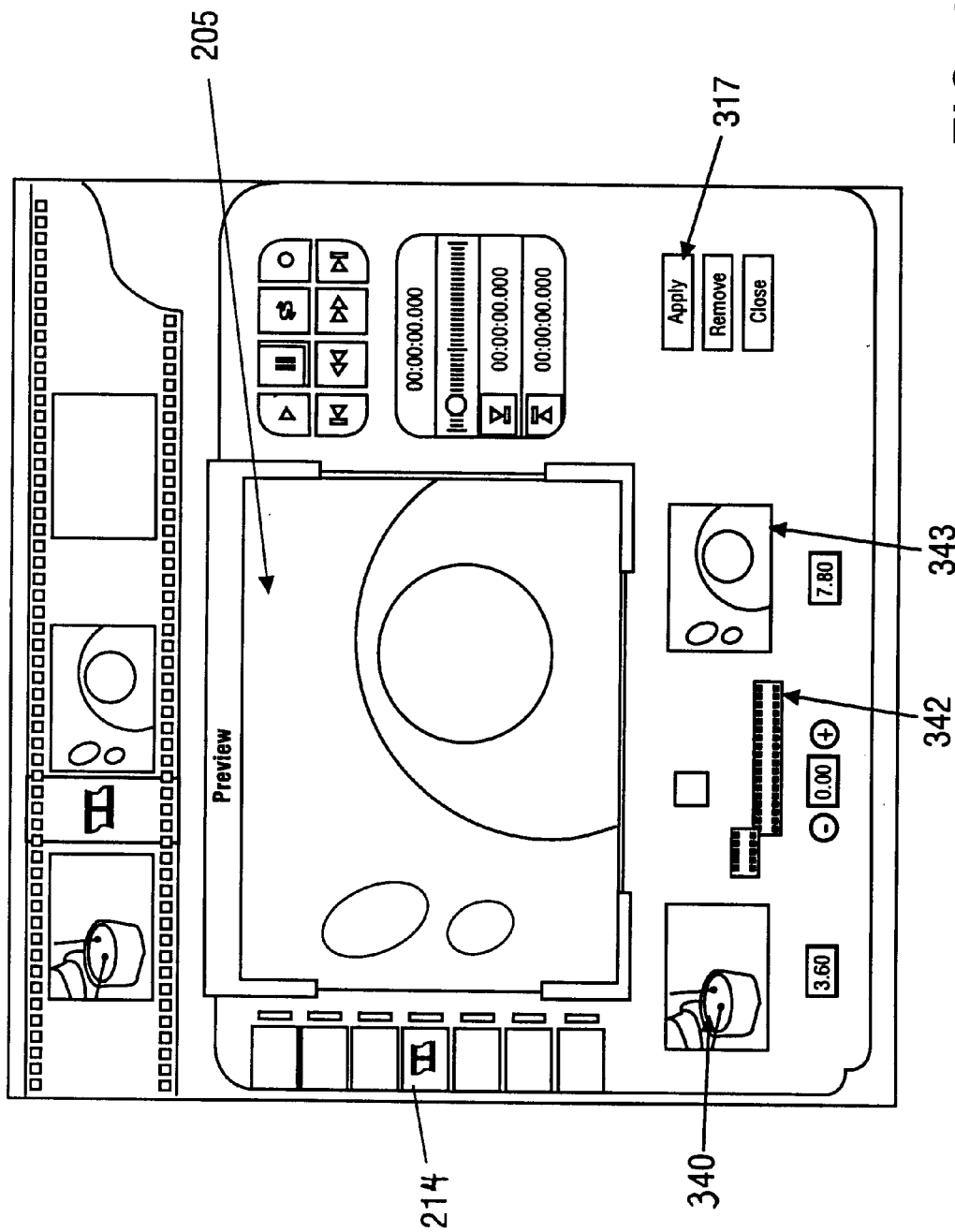
FIG. 3D is a bitmap screen shot of transition editing primary viewing controls of the console of FIG. 1D.

Turning to FIG. 3D, the features of transitions editor 214 are shown. The transitions editor 214 is integrated within the console 200. The transitions editor enables the user to create a transition "effect" between two source object segments for composition purposes. Transition "effects" are displayed as pictorial images and are selected by the user for application from the corresponding "transitions" library accessed through and displayed in source library window 180. When selected, the image indicator of the chosen transition appears in client window 342 as a looping or automatically repeating animated sequence above two film strips. The initial source object is placed by the user in viewing window 205 with a corresponding pictorial image indicator or representative "frame" subsequently appearing in view window 340. The second source object segment is then placed in viewing window 205 with a subsequent image indicator or frame appearing in view window 343. The duration of the transition effect can be determined and adjusted either by manipulation of a representative "film strip" in client window 342 denoting the degree of overlap occurring between the two object segments, or by entering a numeric value in client window 341. Once completed, the effect can be "applied" to the sequence and subsequently viewed by the user in viewing window 205 by activating the apply button 317. The sequence can then be placed on the storyline 170 for composition.

Figure 3E:
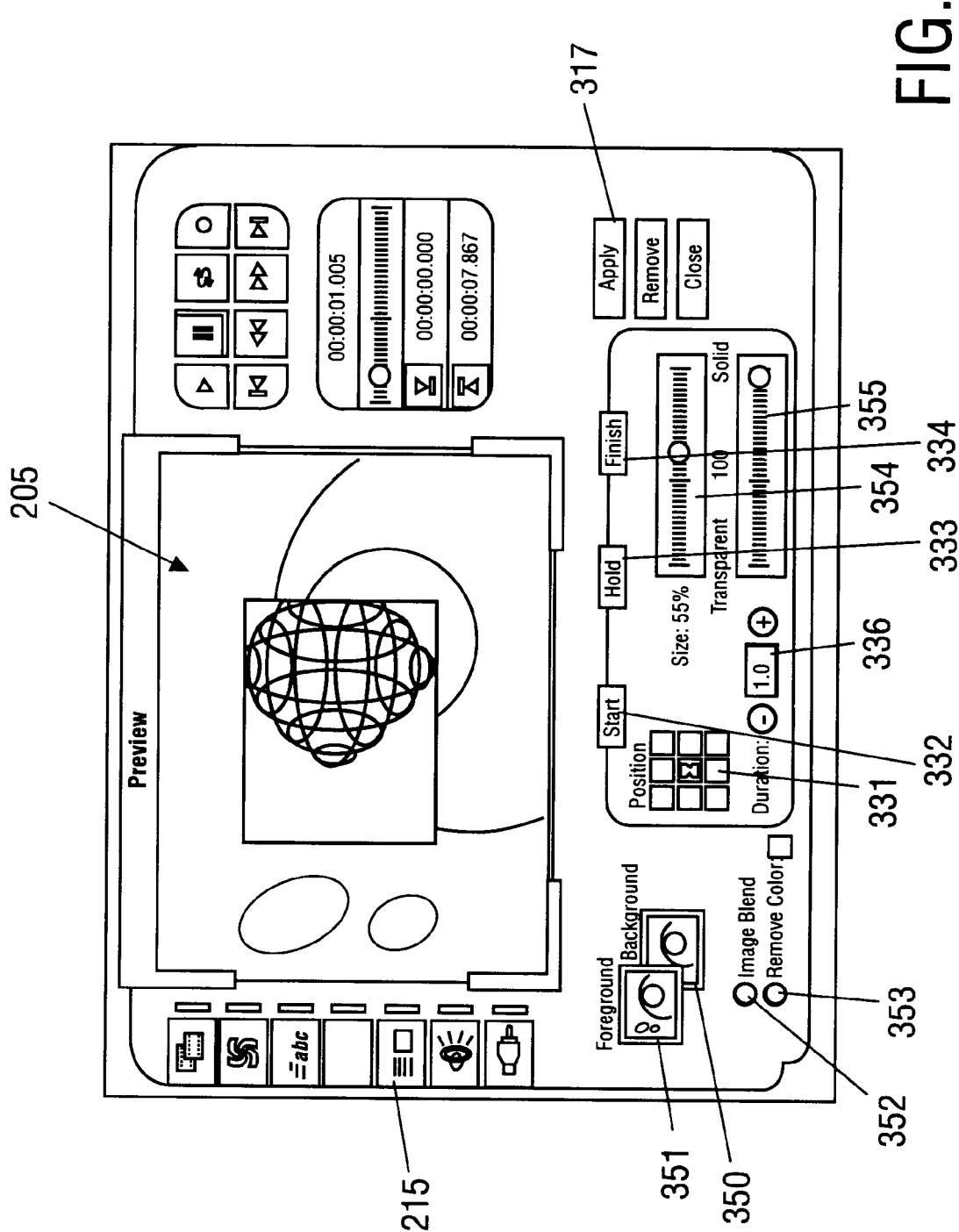
FIG. 3E is a bitmap screen shot of animation controls of the primary viewing console of FIG. 1D.

Turning to FIG. 3E, the features of video animation editor 215 are shown. The video animation editor 215 is integrated within the console 200. The purpose of the video animation editor is to enable one or more "foreground" source animation objects to be applied to a background source animation object. To determine the background of the video animation sequence, the user selects a given source segment from source library window 180 and causes the object to be placed in viewing window 205. The corresponding representation appears in client background window 350. The source object to be overlaid or animated is then selected in the same manner and correspondingly appears in viewing window 205, its relative size being determined using a "slider" ball in slider window 354. A representation of this source segment appears in a client foreground window 351. The user can remove or blend colors in the background and foreground to achieve the desired animation effect using image blend button 352 and remove color button 353 respectively. This "chroma keying" technique is well known to those skilled in the art. The animation path, duration and properties of the source segments or sequences are determined by means of position control pad 331, start button 332, hold button 333, finish button 334, duration box 336 and object transparency slider 335 which operate in a similar manner as described previously with respect to text editor 213. Once completed, the effect can be "applied" to the sequence by activating apply button 317 and subsequently viewed by the user in viewing window 205. The sequence can then be placed on the storyline 170 for composition purposes.

Figure 3F:
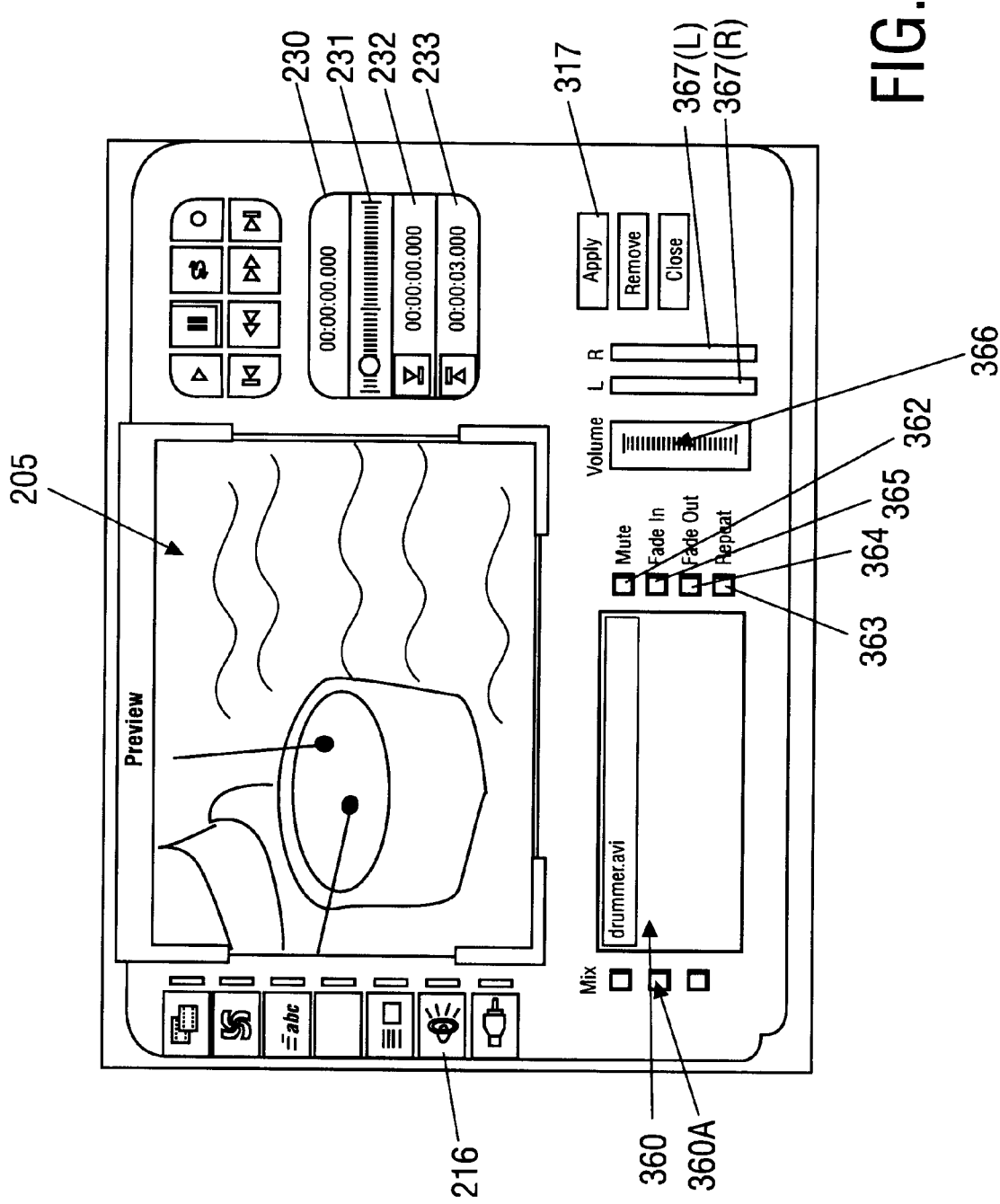
FIG. 3F is a bitmap screen shot of audio composition controls of the primary viewing console of FIG. 1D.

Turning to FIG. 3F, the features of audio editor 216 are shown. The audio editor 216 is integrated with the console 200. The audio editor 216 enables users to add one or more audio "tracks" to a given source object or composition sequence. Activation of audio editor 216 causes a context-sensitive source library listing audio objects to be displayed within source library window 180. The desired audio source object is selected by the user and placed in a list window 360 for composition display purposes. Any audio source object segments or files already associated with the video source object segment being displayed in viewing window 205 are listed within list window 360. One or more audio source object segments can be dynamically added to the video object currently displayed within viewing window 205. Audio objects can be manipulated by selectively activating muting box 362, fade-in box 363, fade-out box 364 and repeat box 365. The amplitude of each audio object and/or "track" of the object can be manipulated by the user by means of a volume control slider 366. Corresponding "level" indicators for both left and right stereo volume levels are displayed on left level indicator 367*l* and right level indicator 367*r* to provide the user with a visual representation of audio sound levels by "channel".

Once completed, the desired audio source object segment can be "applied" to the video sequence by activating apply button 317 and viewed and listened to by the user through console 200. The object in viewing window 205 can then be placed on the storyline 170 for composition purposes. Checkbox 360a allows the user to choose which track of a multi-track audio track displayed in list window 360 is to be manipulated with respect to the object in viewing window 205. An audio amplitude meter displays the amplitude of the audio when played.

Figure 3G:
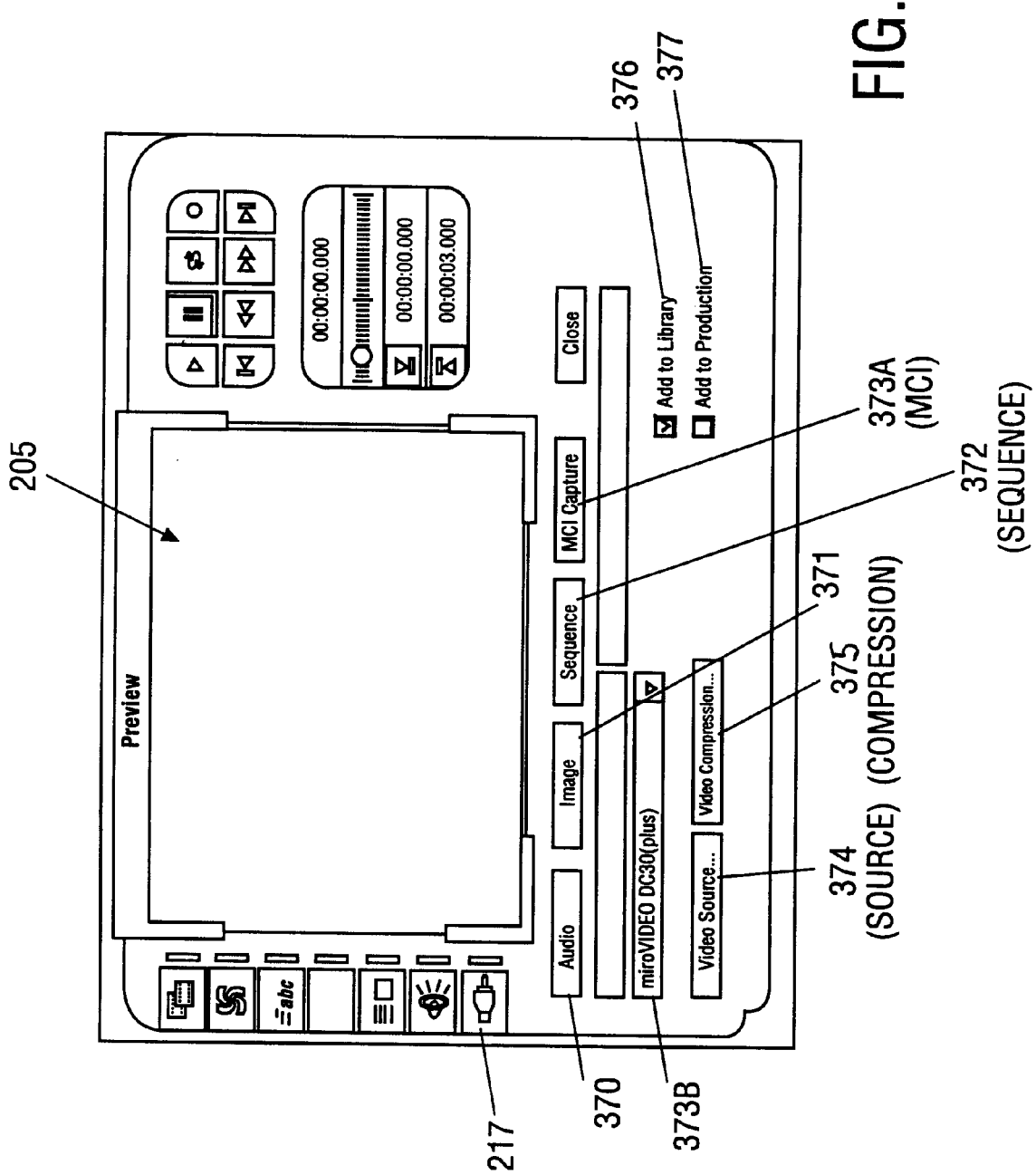
FIG. 3G is a bitmap screen shot of video capture controls of the primary viewing console of FIG. 1D.

Turning to FIG. 3G, the features of capture editor 217 are shown. The capture editor 217 is integrated with the console 200. The capture editor enables users to readily acquire or "capture" video and audio source segments from external sources by means of video and audio recording devices connected to input/output system 21. The capture editor 217 enables the user to switch or toggle between video and audio capture capabilities by means of audio button 370. The user can dynamically capture an image from any video source segment displayed in viewing window 205 by activating image button 371. Sequences of varying duration can be captured by activating sequence button 372. The system can optionally control external devices such as camcorders, VCRs and Media Control Interface (MCI) devices connected to input/output system 21 by activating MCI capture button 373a in conjunction with selecting the appropriate device connected to the computer system 10 from a list of device drivers displayed in driver list box 373b. Once captured, audio and video objects can be added to content source libraries as objects through source library window 180 and actual composition "productions" on storyline 170 by means of activating checkboxes 376 and 377 respectively. Video source button 374, when activated brings up a display box to choose the source device, VCR, camcorder, etc., connected to video input/output system 21 to perform the capture. Compression button 375 allows for the selection and display of a list of video compression techniques to be applied to the captured video.

Figure 3H:
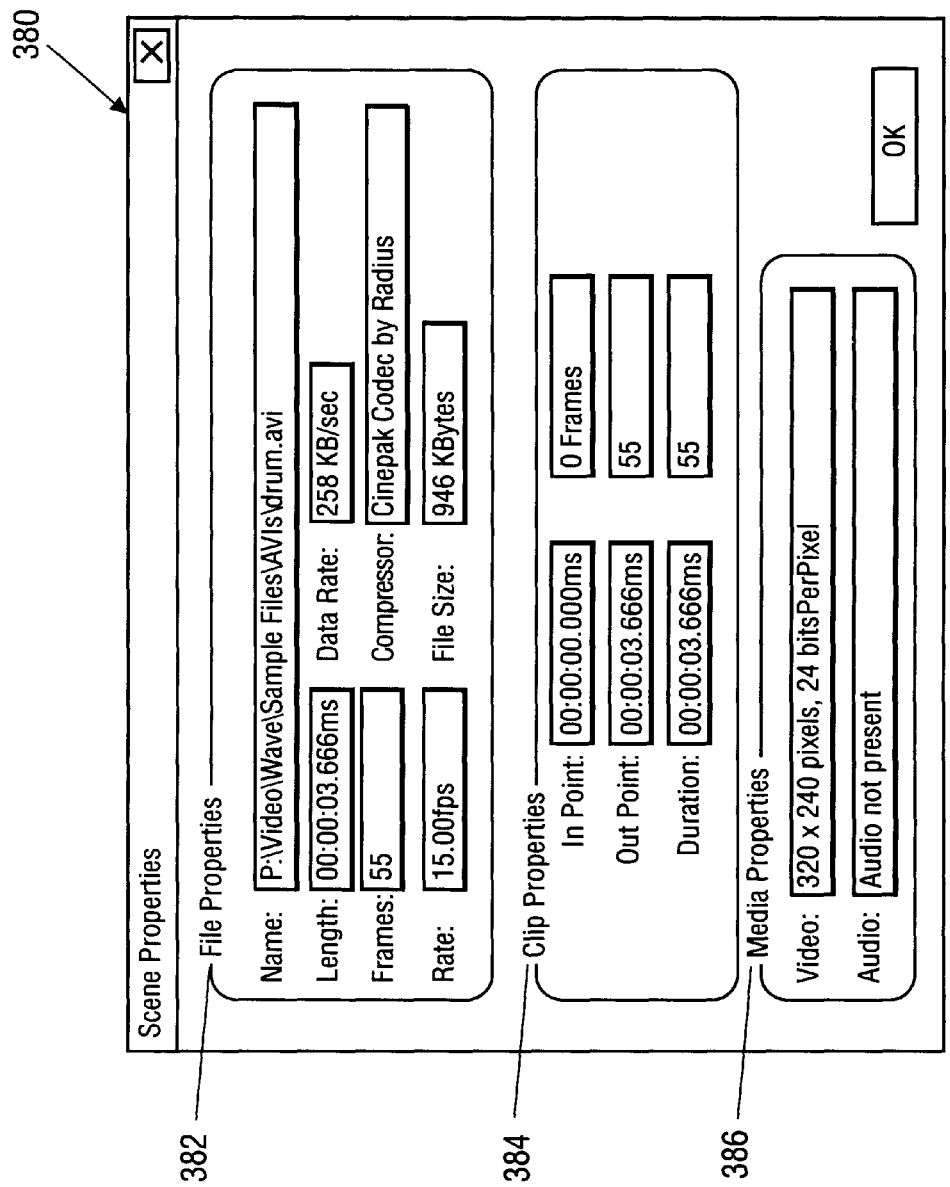
FIG. 3H is a bitmap screen shot of a list of object properties accessible from the primary composition interface of FIG. 1D.

Turning to FIG. 3H, the features of an object property list 380 are better illustrated. The object property list 380 is accessed by first selecting an object from the source library window 180 or film strip 171, then activating the properties option on the user interface 140 by means of a right click of pointing device 15 or from the edit submenu accessible from start button 160. The object properties list 380, displays file properties 382, clip properties 384, and media properties 386 relating to the currently selected object or library item.

Composition Production

Figure 4A:
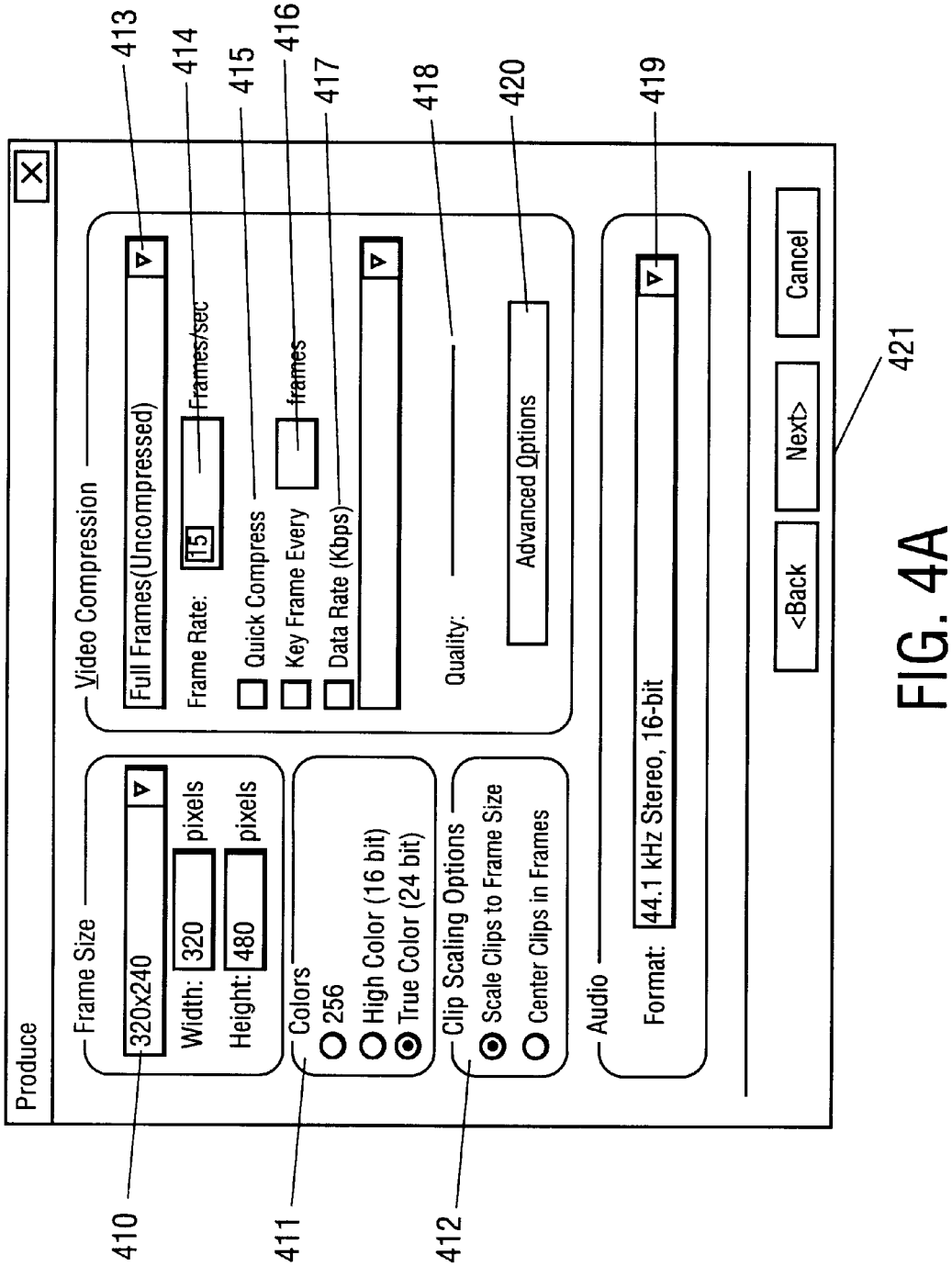
FIG. 4A is a bitmap screen shot of composition pre-production controls on the primary viewing console of FIG. 1D.

Turning to FIG. 4A, a dialog box for manipulation of the composition production output is shown. After completing the composition editing process described above, the user selects the production menu item from the start button 160 on tool bar 150. The user is prompted for an identifier for the output and the desired video format. Once that is entered, the dialog box of FIG. 4A is presented enabling the setting of composition production parameters. The user can select the frame size from frame size list box 410 to adjust pixel width and height for the production. Color control for the number of colors is provided by selecting the desired color button in color selection area 411. Clip scaling options are controlled by selecting the desired clip scaling button in clip scaling selection area 412. The video compression technique such as uncompressed AVI, MPEG, etc. is chosen by selecting the desired method from list box 413. Data rate box 417 allows for the data transfer rate, in bps, to be set for the production. The rate of display of frames can be controlled and optimized by choosing the desired rate from frame rate box 414. Quick compress box 415 allows for the selection of quick compression to be applied to the production. The key frame box 416 allows for the choice of the frequency for reference or "key" frames to be generated in the production. Production quality can be adjusted by means of a variable slider 418. Audio format menu list box 419 allows for the selection of the selected audio output format for the production. Access to advanced encoder options supplied by a third party such as Microsoft is accomplished by clicking on an Advanced Options button 420. Pressing a "next" button 421 takes the user to the next step in the composition production process, as illustrated in FIG. 4B.

Figure 4B:
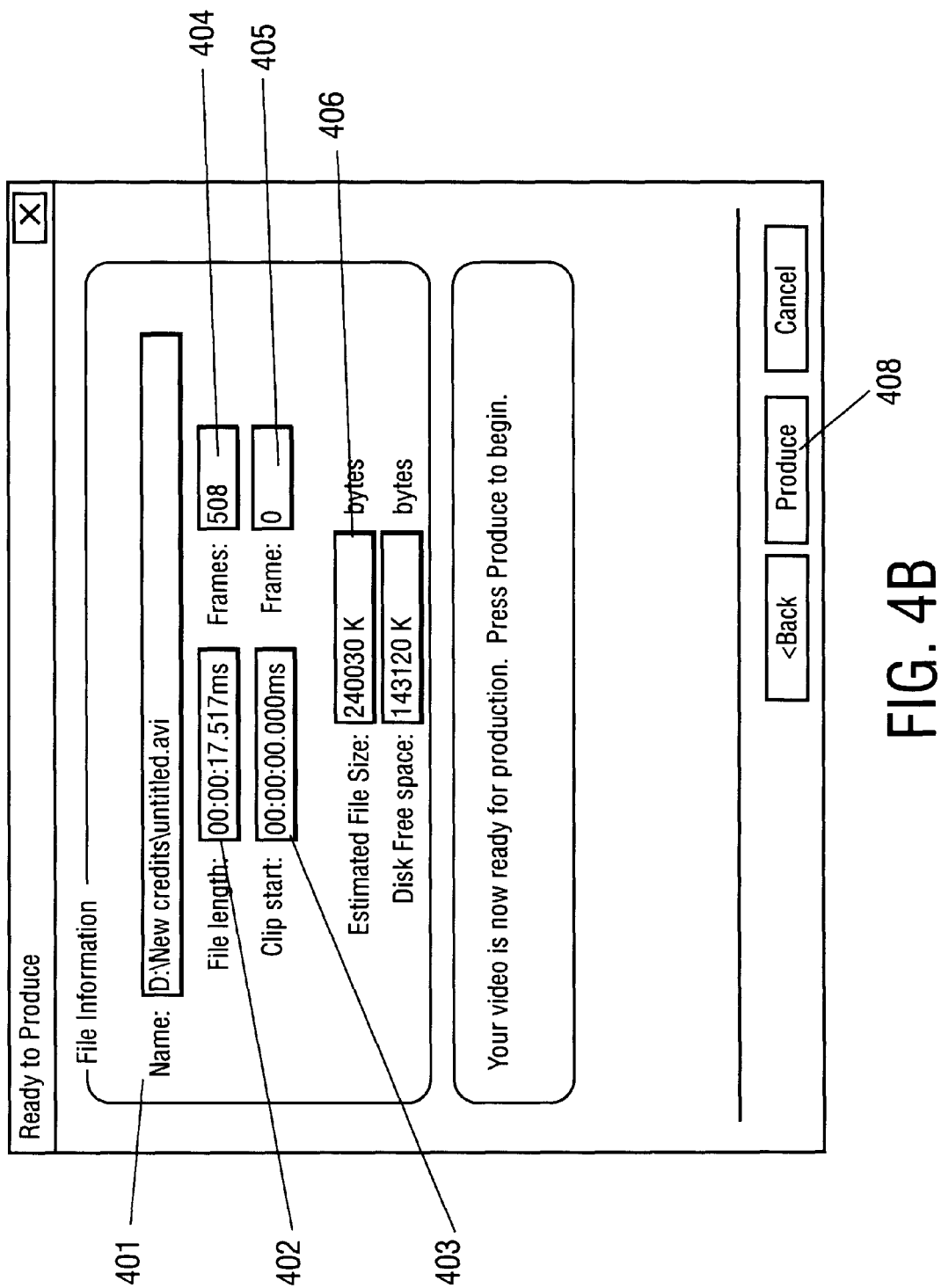
FIG. 4B is a bitmap screen shot of the composition production controls of the primary viewing console of FIG. 1D.

Turning to FIG. 4B, the screen for controlling composition production is shown. The current output file name or device, which can be modified by the user, appears in file name display window 401. The numeric file length value is displayed in box 402. The source segment or "clip" is displayed in clip start box 403. The total number of frames in the given composition sequence is shown in frame box 404. The current frame is displayed in frame box 405. The estimated file size is shown in file size box 406. The user can proceed to the next step in the composition production process by placing the pointer on the "Produce" button 408 and clicking the mouse 15. The final composition is then generated and stored in mass storage device 17 or input/output subsystem 21.

Figure 5A:
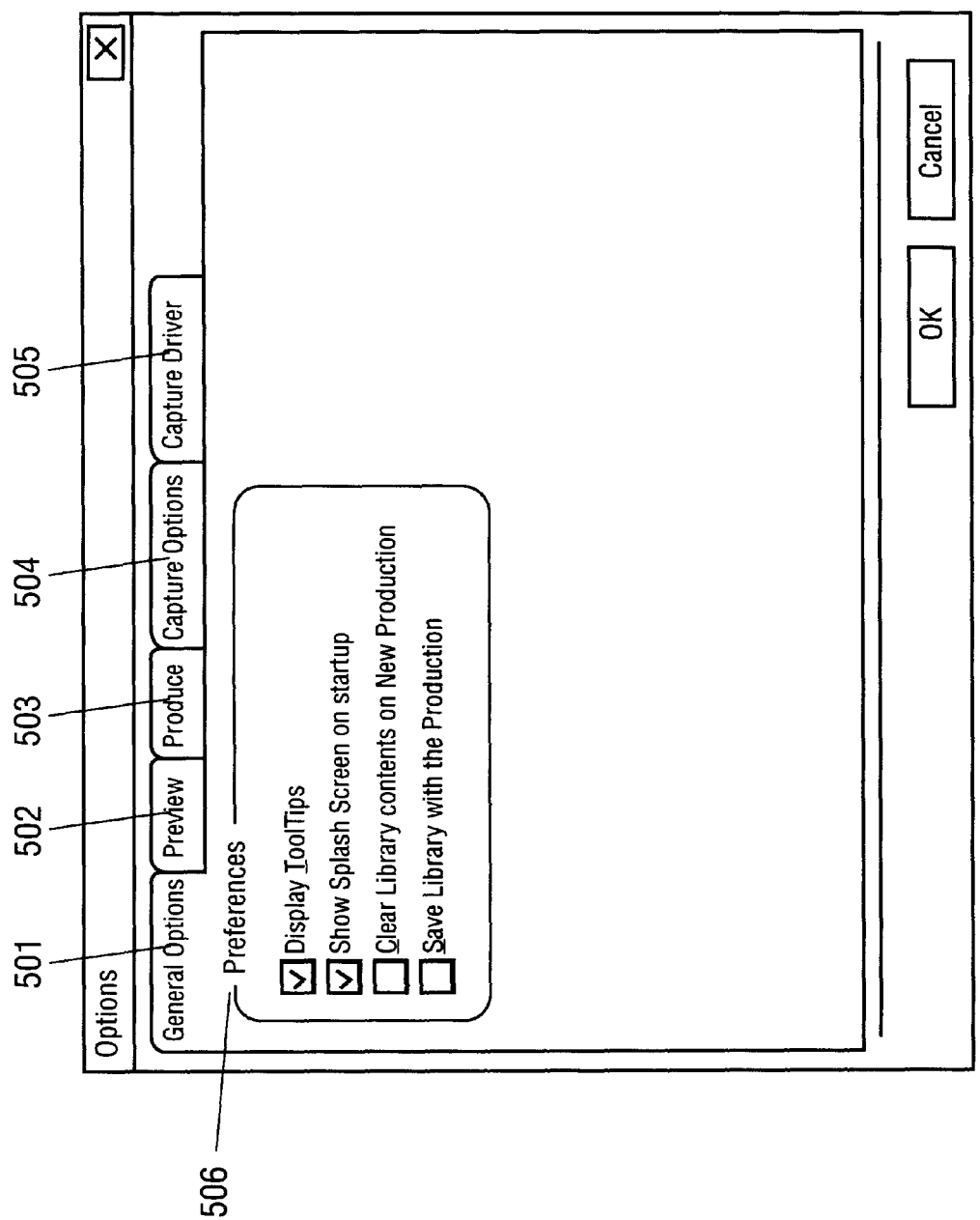
FIG. 5A is a bitmap screen shot of general system options accessible from the primary composition interface of FIG. 1D.

Turning to FIG. 5A, the screen for displaying and controlling various user defined options is shown. These are accessed by activating the start button 160 on tool bar 150. The user defined options which can be manipulated fall into numerous categories as discussed below. General options can be accessed by activating general options tab 501, source material preview options can be accessed by activating preview options tab 502. Composition production options can be accessed by activating produce tab 503. Capture options can be accessed by activating capture options tab 504. Finally, capture driver options can be accessed by activating capture driver tab 505. System preference management options are accessible from tab 501 and include display tool tips, show splash screen on startup, clear library contents on new productions, and save library with the production option settings which are invoked by means of activating the appropriate checkbox in preferred checkbox area 506.

Figure 5B:
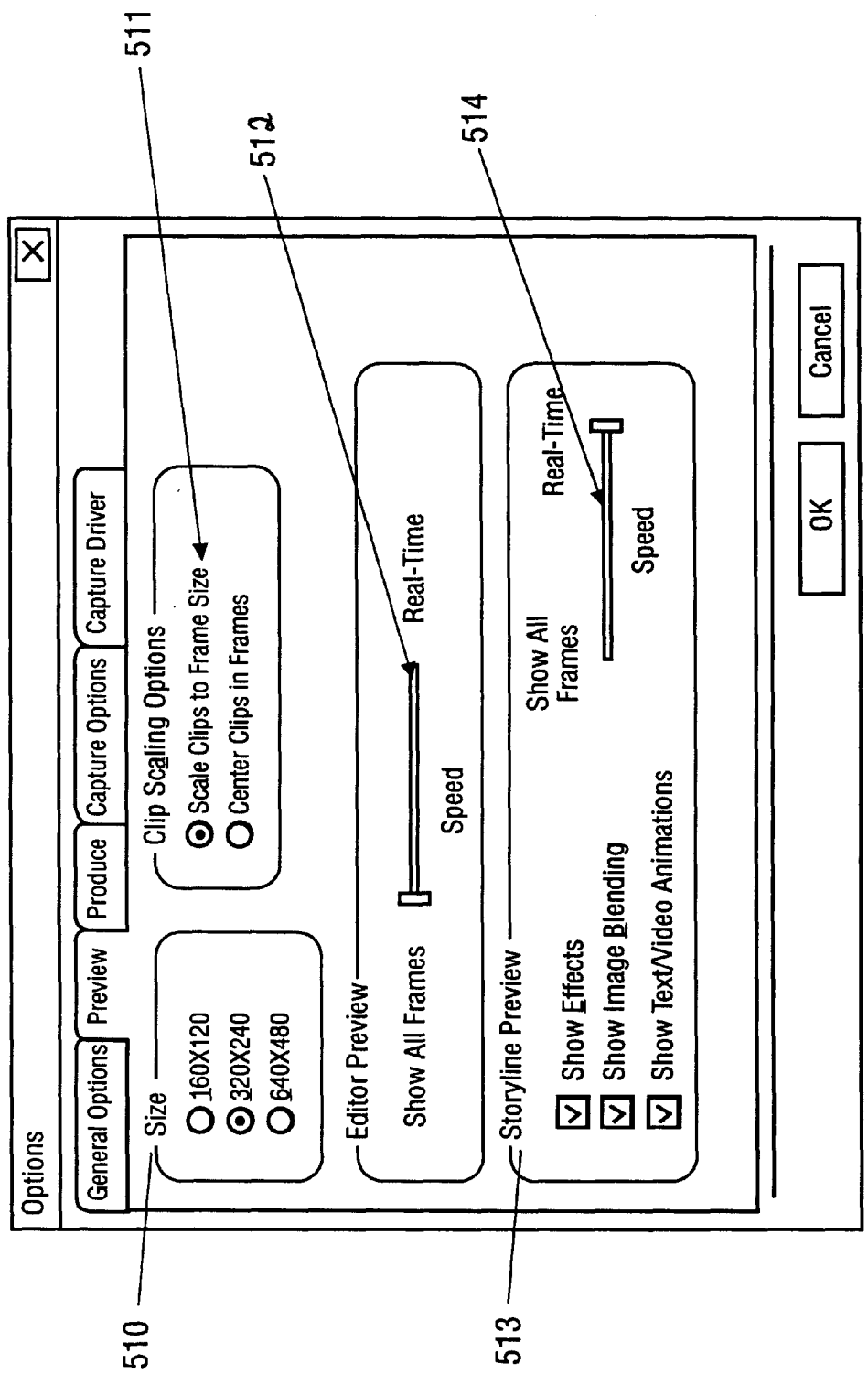
FIG. 5B is a bitmap screen shot of source material dynamic preview options and controls accessible from the primary composition user interface of FIG. 1D.

Turning to FIG. 5B, the preview options accessible upon activation of preview options tab 502 are shown. Preview options illustrated include default source video segment presentation size in pixels selected from size buttons box 510. Clip scaling options are set by selecting the appropriate button in clip scaling area 511. The video editor preview display window 512 employs a slider and representative speed scale to enable the user to adjust the frame rate to optimize viewing speed. The storyline preview options 513 can be adjusted by selecting the desired checkbox options to show effects, show image blending and show text/video animations. Video display frame rates can be adjusted with a slider and representative speed scale in slider window 514.

Figure 5C:
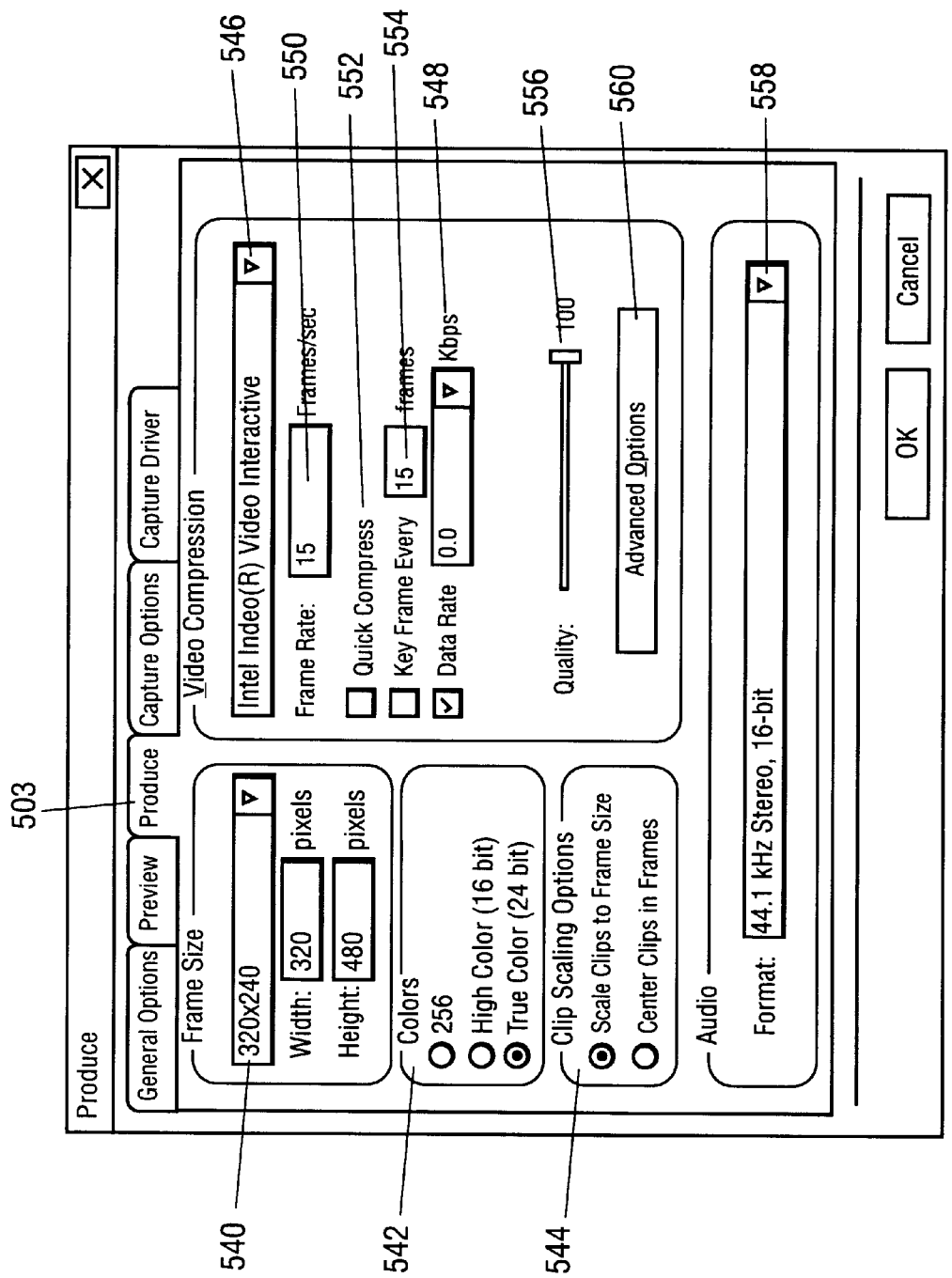
FIG. 5C is a bitmap screen shot of composition production options and controls accessible from the primary composition user interface of FIG. 1D.

Turning to FIG. 5C, the default produce options accessible upon activation of produce options tab 503 are shown. The user can select the frame size from frame size list box 540 to adjust pixel width and height for the production. Color control for the number of colors is provided by selecting the desired color button in color selection area 542. Clip scaling options are controlled by selecting the desired clip scaling button in clip scaling selection area 544. The video compression technique such as uncompressed AVI, MPEG, etc. is chosen by selecting the desired method from list box 546. Data rate box 548 allows for the data transfer rate, in bps, to be set for the production. The rate of display of frames can be controlled and optimized by choosing the desired rate from frame rate box 550. Quick compress box 552 allows for the selection of quick compression to be applied to the production. The key frame box 554 allows for the choice of the frequency for reference or "key" frames to be generated in the production. Production quality can be adjusted by means of a variable slider 556. Audio format menu list box 558 allows for the selection of the selected audio output format for the production. Access to advanced encoder options supplied by a third party such as Microsoft is accomplished by clicking on the Advanced Options button 560.

Figure 5D:
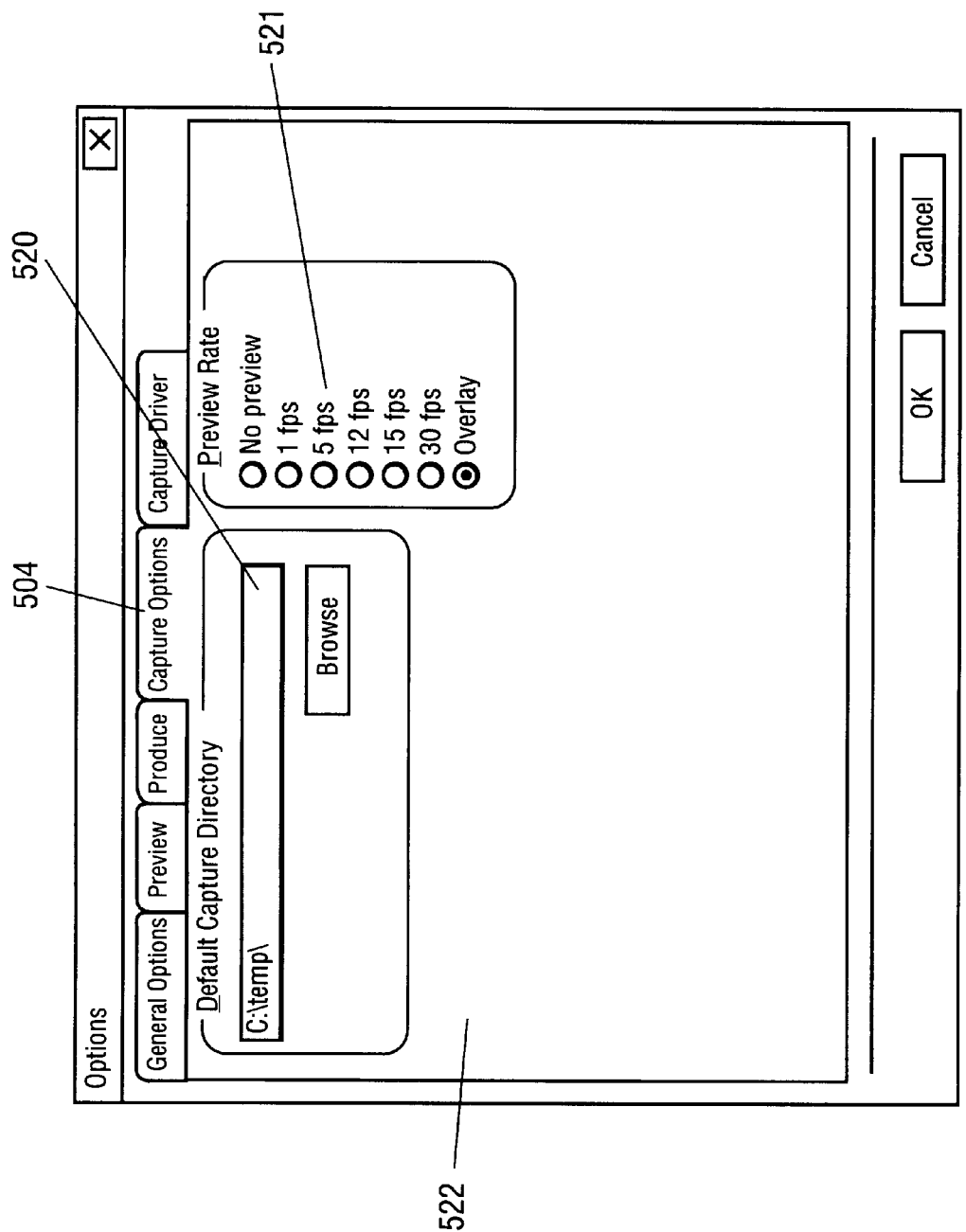
FIG. 5D is a bitmap screen shot of source material capture or acquisition options and controls accessible from the primary composition user interface of FIG. 1D.

Turning to FIG. 5D, the capture options accessible upon activation of capture options tab 504 are shown. The default capture directory can be set in directory window box 520. The preview video frame rates can be adjusted by selecting the appropriate box in checkbox area 521. The general options area 522 allows the user to "open capture at startup" and "stop capture preview when window not active" by allowing the user to check the associated checkbox.

Figure 5E:
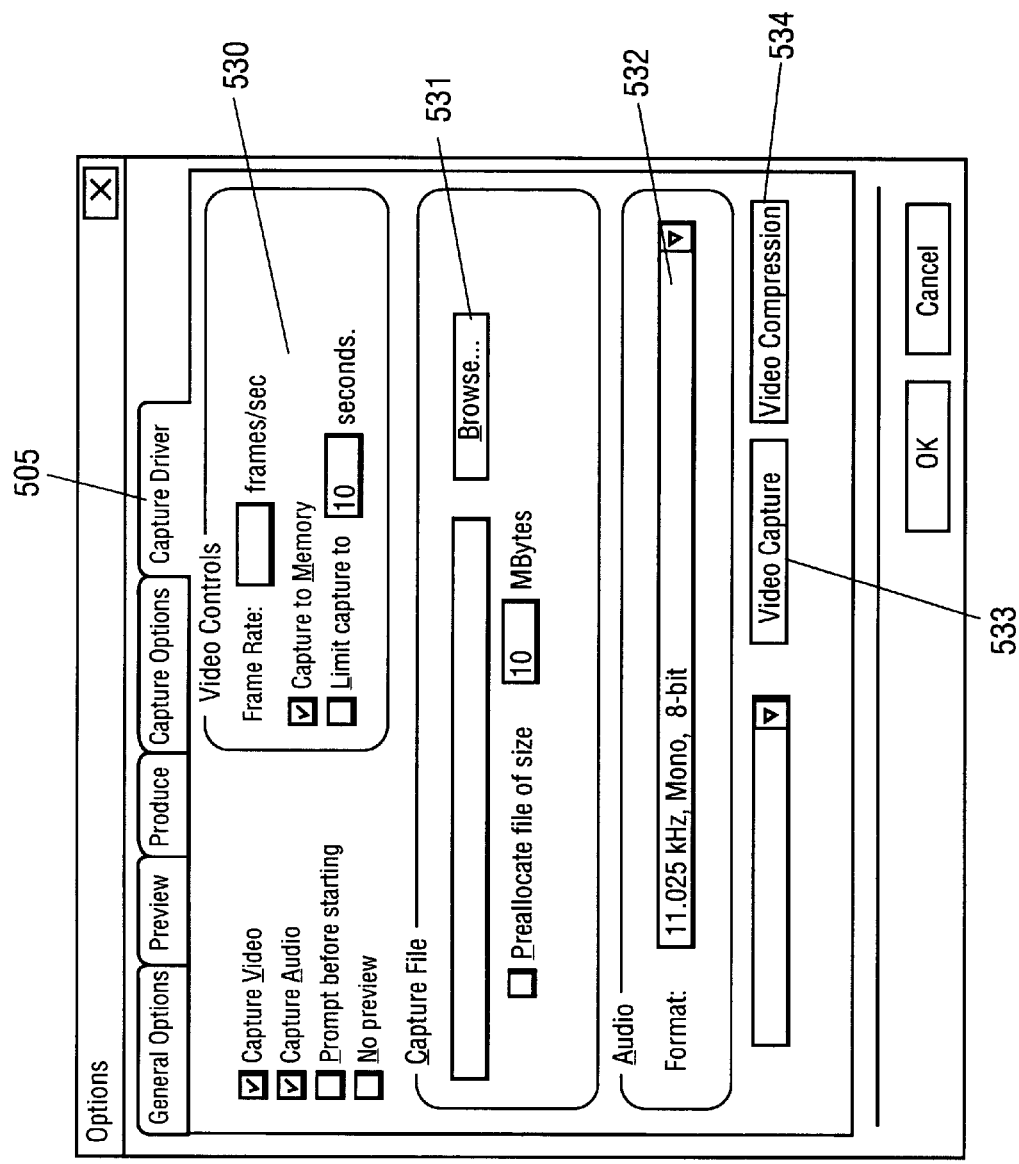
FIG. 5E is a bitmap screen shot of content capture driver options and controls accessible from the primary composition user interface of FIG. 1D.

Turning to FIG. 5E, the capture driver system options accessible upon activation of capture driver tab 505 are shown. The capture driver system options illustrated in FIG. 5F include check boxes for assigning video capture preferences in video control area 530, including source material frame rate, capture limits in terms of length of time, capture to memory, capture with audio, prompt before starting, and preview options. The capture file can be set in browse window 531 enabling the user to pre-allocate storage location and file size. Display list window 532 enables the user to select the audio format of captured audio source materials, while video source button 533 enables the user to select the desired video source from input/output subsystem 21 or mass storage 17. Video compression button 534 allows the user to select a variety of industry standard compression options by means of a "drop down" menu list.

The digital video, audio and multimedia composition program described herein provides the user with remarkable flexibility and ease of use in the manipulation and composition of digital source materials. The assembled material can be gathered from numerous sources, including on-line storage devices, analog to digital signal capture devices, scanners, compact discs and digital cameras, then rapidly edited and assembled in any desired order to create complete compositions. The user can reorder scenes, trim, shorten or lengthen sequences, add new source materials, transitions, animations, titles and text, edit audio, add voice overs, music and other special effects in a completely temporal, non-timeline-based composition environment. This process can be repeated as many times as necessary until the composition is deemed satisfactory for final production in one or multiple formats for any number of commercial or personal uses.

In contrast to conventional video and audio composition applications, even those operating in a windowing environment, the primary composition user interface 140 includes user-familiar objects, i.e. paradigms of real world objects that a typical user should already know how to use. The complexities of the operations are hidden under ordinary, everyday object metaphors. All of the input source materials, edited materials, transitions and output are treated as objects. The objects can be "played" in part or in whole or caused to loop or repeat indefinitely at any given time during the composition process. In other words, the objects represent materials that vary over time. The primary composition user interface 140 provides a highly intuitive presentation of advanced features (e.g. special effects, transitions, etc.) that are easily selected and invoked.

Although a preferred embodiment of the present invention has been described, those of skill in the art will appreciate that the present invention is not limited to any particular application or any particular environment. The system and method of the present invention may be applied advantageously to a variety of systems and applications software, including but not limited to audio composition, three dimensional animation, multimedia authoring and the like. Moreover, the present invention may be embodied on a variety of different hardware and software platforms, including UNIX, Macintosh™ and the like.

Although a preferred embodiment of the present invention has been described, those of skill in the art will appreciate that variations and modifications may be made without departing from the spirit and scope thereof as defined by the appended claims.

We claim:

1. A method for non-timeline, non-linear digital multimedia composition comprising:
   representing multimedia materials stored in memory as objects;
   retrieving one or more of said multimedia materials from said memory for display on a composition console;
   dynamically viewing and editing said one or more multimedia materials on said composition console;
   placing the objects representing said one or more multimedia materials on a non-frame based storyline strip of said composition console to create a storyline that is viewable on said composition console, said storyline strip including object viewing and object transition positions; and
   producing a multimedia output file from objects and transitions on said storyline.

2. The method of claim 1 further comprising editing said storyline.

3. The method of claim 2 wherein said editing said storyline includes reorganizing objects thereon and dynamically viewing and editing said objects on said composition console.

4. The method of claim 3 wherein said multimedia materials includes image, video, audio, and text materials.

5. A system for non-timeline, non-linear digital multimedia composition, the system comprising:
   means for representing multimedia materials stored in memory as objects;
   means for retrieving one or more of said multimedia materials from said memory for display on a composition console;
   means for dynamically viewing and editing said one or more multimedia materials on said composition console;
   means for placing the objects representing said one or more multimedia materials on a non-frame based storyline strip of said composition console to create a storyline that is viewable on said composition console, said storyline strip including object viewing and object transition positions; and
   means for producing a multimedia output file from objects and transitions on said storyline.

6. The system of claim 5 further comprising means for editing said storyline.

7. The system of claim 6 wherein said means for editing said storyline includes means for reorganizing edited objects thereon and means for dynamically viewing and editing said edited objects on said composition console.

8. The system of claim 7 wherein said multimedia materials includes image, video, audio, and text materials.

9. A computer readable media encoded with a computer program for creating non-timeline, non-linear digital multimedia compositions from multimedia materials stored in memory and represented by objects comprising:
   means for retrieving one or more of said multimedia materials from said memory for display on a composition console;
   means for dynamically viewing and editing said one or more multimedia materials on said composition console;
   means for placing the objects representing said one or more multimedia materials on a non-frame based storyline strip of said composition console to create a storyline that is viewable on said composition console, said storyline strip including object viewing and object transition positions; and
   means for producing a multimedia output file from objects and transitions on said storyline.

10. A method for producing a multimedia composition comprising:
    providing a user interface having a source material object window and a non-frame based storyline strip, said storyline strip having object viewing and object transition positions;
    associating individual identifiers in said window with time varying dynamic multimedia source material objects;
    choosing one of said identifiers in said window to retrieve a selected source material object;
    dragging said chosen identifier across said interface to one of said object viewing positions on said storyline strip;
    repeating said choosing and dragging to organize a multi-object multimedia composition in a desired order; and
    generating a multimedia output file based on chosen identifiers and transitions organized on said storyline strip.

11. The method of claim 10 wherein said source material objects include video objects, audio objects and combined audio-visual objects.

12. The method of claim 10 further comprising moving said chosen identifier from a first object viewing position to a second object viewing position on said storyline strip to organize said composition.

13. The method of claim 10 wherein said multimedia output file is presented on an audio-visual display.

14. The method of claim 10 wherein said multimedia output file is stored in external memory.

15. The method of claim 10 wherein said multimedia output file is stored via a tape device.

16. The method of claim 10 wherein said source material objects are retrieved from a remote source.

17. A system for creating a multimedia composition from multimedia source material objects, the system comprising:
    a user interface comprising:
      a tool bar for accessing system functions;
      a source library window for accessing multimedia source material objects;
      a console for previewing and editing said multimedia source material objects to create output objects; and
      a non-frame based storyline strip for assembling said output objects and transitions therebetween to form a multimedia output file, said storyline strip including object viewing and object transition positions;
    a processor for editing said source material objects and creating said multimedia output file in response to user input entered via said user interface; and
    a display for displaying said multimedia output file on said console.

18. The system of claim 17 wherein said processor is operable to output said multimedia output file to an output device.

19. The system of claim 17 wherein said output device is a memory storage medium.

20. The system of claim 17 wherein said console includes a preview area, and a plurality of editing tool activators corresponding to a plurality of editing tools selectable to edit said multimedia source material objects.

21. The system of claim 20 wherein the activation of a selected one of said editing tool activators causes said console to display the controls of said corresponding editing tool.

22. The system of claim 17 wherein said tool bar includes a plurality of two dimensional iconic activators, said iconic activators transforming into three dimensional activators in response to movement of a pointing device in close proximity.

23. The system of claim 17 wherein said tool bar contains a plurality of two dimensional activators, said activators being conditioned to exhibit three dimensional rotation when activated to signal that the operation corresponding to said activator has been initialized.

24. A system for producing a multimedia composition, the system comprising:

means for generating a user interface having a source material object window and a non-frame based storyline strip, said storyline strip having object viewing and object transition positions;

means for associating individual identifiers in said window with time varying dynamic multimedia source material objects;

means for choosing one of said identifiers in said window to retrieve a selected object;

means for placing said chosen identifier at one of said object viewing positions on said storyline strip to organize a multi-object, multimedia composition in a desired order; and means for generating a multimedia output file based on chosen identifiers and transitions organized on said storyline strip.

25. The system of claim 24 wherein said source material objects include video objects, audio objects and combined audio-visual objects.

26. The system of claim 24 wherein said means for organizing includes means for moving said chosen identifier from a first object viewing position to a second object viewing position on said storyline strip to organize said composition.

27. A computer readable media encoded with a computer program for producing a multimedia composition from multimedia materials stored in memory as source material objects comprising:

means for generating a user interface having a source material object window and a non-frame based storyline strip, said storyline strip having object viewing and object transition positions;

means for associating individual identifiers in said window with time varying dynamic multimedia source material objects;

means for choosing one of said identifiers in said window to retrieve a selected source material object from memory;

means for placement of one or more chosen identifiers at selected positions on said storyline strip to organize a multi-object, multimedia composition in a desired order; and means for generating a multimedia output file based on chosen identifiers and transitions organized on said storyline strip.

28. A method for digital multimedia composition comprising:

selecting multimedia data segments;

arranging the selected multimedia data segments on a single non-frame based storyline strip;

inserting transitions between adjacent multimedia data segments on the storyline strip; and combining the selected multimedia data segments based on their arrangement on the storyline strip and based on the inserted transitions, to produce a multimedia output file from the storyline strip.

29. The method of claim 28 wherein during said selecting multimedia data segments are selected from the group consisting of audio, video, image and text.

30. The method of claim 28 further comprising editing at least one of the selected multimedia data segments.

31. The method of claim 28 wherein said arranging comprises synchronizing selected multimedia data segments.

32. The method of claim 28 wherein the multimedia output file is an AVI file.

33. The method of claim 28 wherein the multimedia output file is an MPEG file.

34. A digital multimedia composition system comprising:

a user interface for selecting multimedia data segments, for arranging the selected multimedia data segments on a single non-frame based storyline strip, and for inserting transitions between adjacent multimedia data segments on the storyline strip; and a processor combining the selected multimedia data segments based on their arrangement on the storyline strip and based on the inserted transitions, to produce a multimedia output file from the storyline strip.

35. The digital multimedia composition system of claim 34 wherein the multimedia data segments are selected from the group consisting of audio, video, image and text.

36. The digital multimedia composition system of claim 34 further comprising a multimedia editor for editing at least one of the selected multimedia data segments.

37. The digital multimedia composition system of claim 34 wherein the user interface is used for synchronizing selected multimedia data segments.

38. The digital multimedia composition system of claim 34 wherein the multimedia output file is an AVI file.

39. The digital multimedia composition system of claim 34 wherein the multimedia output file is an MPEG file.

* * * * *